United States Patent [19]
Malke et al.

[11] Patent Number: 5,320,437
[45] Date of Patent: Jun. 14, 1994

[54] PRINTER WITH A PRINTER HOUSING DIVIDED IN THE PLANE OF THE PRINT CARRIER

[75] Inventors: Wolfgang Malke; Günter Baitz, both of Berlin; Siegfried Wieschemann, Paderborn-Marienloh, all of Fed. Rep. of Germany

[73] Assignee: Siemens Nixdorf Informationssysteme Aktiengesellschaft, Fed. Rep. of Germany

[21] Appl. No.: 924,073
[22] PCT Filed: Mar. 15, 1991
[86] PCT No.: PCT/EP91/00494
§ 371 Date: Sep. 15, 1992
§ 102(e) Date: Sep. 15, 1992
[87] PCT Pub. No.: WO91/13765
PCT Pub. Date: Sep. 19, 1991

[30] Foreign Application Priority Data

Mar. 16, 1990 [DE] Fed. Rep. of Germany ....... 4008541

[51] Int. Cl.⁵ .................................................. B41J 11/50
[52] U.S. Cl. .................................. 400/605; 400/208; 400/692; 400/642
[58] Field of Search ............. 400/605, 680, 82, 88, 400/66, 73, 78, 584, 692, 693, 691, 208, 642, 649, 154.2, 154.5

[56] References Cited

U.S. PATENT DOCUMENTS

| | | | |
|---|---|---|---|
| 4,011,811 | 3/1977 | Kodis | 101/66 |
| 4,531,852 | 7/1985 | Madge et al. | 400/692 |
| 4,629,345 | 12/1986 | Suzaki et al. | 400/208 |
| 4,655,625 | 4/1987 | Brull et al. | 400/605 |
| 4,732,502 | 3/1988 | Yokoi | 400/693 |
| 4,775,870 | 10/1988 | Grimm et al. | 400/613.3 |
| 5,061,100 | 10/1991 | Brouwer et al. | 400/642 |
| 5,067,832 | 11/1991 | Baur et al. | 400/82 |
| 5,122,005 | 6/1992 | Kamei | 400/691 |
| 5,137,385 | 8/1992 | Kamimura et al. | 400/692 |
| 5,186,558 | 2/1993 | Sherman et al. | 400/88 |
| 5,230,576 | 7/1993 | Sone | 400/649 |

FOREIGN PATENT DOCUMENTS 0150761 8/1985 European Pat. Off. .
63-139774 6/1988 Japan .
2221898 2/1990 United Kingdom .

Primary Examiner—Eugene H. Eickholt
Attorney, Agent, or Firm—Hill, Steadman & Simpson

[57] ABSTRACT

The invention relates to a flat printer which is divided in a print carrier plane into a lower housing part and a housing cover which can be placed on or lifted off the latter. The housing cover is pivotably connected to the lower housing part. In a basic version, the housing cover contains only inactive functional components, namely a printing abutment as well as upper transport rollers. All the active functional components, namely the printing head, the driven lower transport rollers with their drives, as well as the drive for the ink ribbon cassette are arranged in the lower housing part. The electronic drive and control device is designed as a circuit board, onto which the functional components to be connected to it are preferably plugged directly.

37 Claims, 14 Drawing Sheets

PRINTER WITH A PRINTER HOUSING DIVIDED IN THE PLANE OF THE PRINT CARRIER

BACKGROUND OF THE INVENTION

The present invention relates to a printer of the type having at least one printing station, having a printer housing divided in a print carrier plane, with a lower housing part and a housing cover which can be placed on the lower housing part or lifted off the latter, the lower housing part holding a first group of functional components with a printing head which can travel in the print line direction, lower print carrier transport rollers interacting with transport roller abutments, and an ink ribbon system, in each case with their drive devices, and in the upper housing cover a second group of functional components with a printing abutment for the printing head. It should be noted that in the following the term "print carrier" is used for the respective material to be printed, which is preferably paper.

A design in which the printer is divided as described above on the one hand offers the possibility of making the housing cover exchangeable, in order to adapt the printer, for example, to different printing processes; and on the other hand, such a division makes access possible in a particularly favorable way to individual functional components in the case of service, for example to the paper transport channel in the case of a paper jam.

A printer is disclosed by DE 35 11 386 A1. In the case of this printer, two print carrier planes are provided in the lower housing part, which lie one above the other and for which there are in each case a printing head, a printing abutment and a paper transport device. This arrangement is intended to make it possible to equip the printer optionally with a plurality of printing stations, in order to be able to use it, for example, as a cash-till printer with a voucher printing station, a day-book printing station and a receipt printing station. The known printer uses as ink ribbon system an ink ribbon cassette which is inserted upright into the lower housing part in a lateral region. Due to the arrangement of two print carrier planes one above the other and the upright ink ribbon cassette, provided in the case of the known design, a high construction is obtained, which in turn has the consequence that the electrical and electronic functional components are distributed in an unfavorable way over the entire inner space of the printer housing, so that they have to be connected by means of cable harnesses to one another and to an electronic control device provided in the printer housing, which makes the installation and also the servicing of such a printer more difficult and more expensive.

SUMMARY OF THE INVENTION

It is the object of the present invention to provide a printer of the type described above which can be adapted flexibly to different printing tasks, at the same time nevertheless has a very flat construction and with which in particular the installation of the electrical and electronic functional components and servicing work carried out on them is made more simple and consequently less expensive.

This object is achieved according to the invention by there being provided only one print carrier plane, lying in the dividing plane, one printing head assigned to this print carrier plane, in that an electrical or electronic drive and control module arrangement is provided in the lower housing part, to which essentially all of the electrical and electronic functional components of the printer are electrically connected and in that an ink ribbon cassette, receiving an ink ribbon, can be installed in the front region of the lower housing part in such a way that its upper bounding surfaces are flush with the print carrier plane, transport rollers arranged in the ink ribbon cassette being coupled to at least one drive pin, protruding through the installation surface for the ink ribbon cassette.

In the case of the printer according to the invention there is provided only one print carrier plane, lying in the dividing plane of the printer housing, and one printing head assigned to this print carrier plane. In the case of a basic version of the printer, this printing head forms with, on the one hand the functional components arranged in the lower housing part and required for its operation, and on the other hand the functional components arranged in the housing cover, a first printing station, for example for single-sheet and endless-sheet printing. The elimination of a plurality of print carrier planes lying one above the other represents a first essential measure for reducing the overall height of the printer, the possibility existing, as described more precisely later, of setting up a plurality of, for example three, printing stations.

A further measure for reducing the overall height is to provide in the lower housing part an electrical or electronic drive and control module arrangement, to which essentially all the electrical and electronic functional components of the printer are directly plug-connected. This produces a very compact arrangement of these functional components and creates a precondition for a particularly flat arrangement, as is described more precisely later with reference to an illustrative embodiment. Moreover, due to direct plug connections of the functional components to the drive and control module arrangement, there are, for example, no longer any cable connections between the functional components on the one hand and between the latter and the drive and control module arrangement on the other hand, so that installation and any servicing work is also considerably facilitated.

As a third essential measure for achieving the set object, it is provided that the ink ribbon cassette can be installed in the front region of the lower housing part in such a way that its upper bounding surfaces are flush with the print carrier plane; in the case of an arrangement lying flat, first of all there is no longer the necessity to adapt the overall height of the printer housing to the dimensions of the upright ink ribbon cassette, so that in this respect also a reduction in the overall height is possible. Moreover, the ink ribbon cassette can in this case perform an additional task apart from its task of receiving the ink ribbon, by serving, for example, as support table for a print carrier, so that a separate support table, for instance above the ink ribbon cassette, is not required, a fact which can in turn be utilized to achieve a reduction in the overall height of the printer.

A particularly flat arrangement of the functional components accommodated in the lower housing part is obtained if, according to the invention, the drive and control module arrangement is designed as a flat circuit board which is arranged over the bottom of the lower housing part and on which the assigned functional components are installed corresponding to their intended spatial arrangements.

According to a development of the invention, the upper side of the lower housing part is formed by a top plate which lies essentially in the print carrier plane and has a depressed region for receiving the ink ribbon cassette, which can be laid flat into the depressed region with an upper side flush with the print carrier plane; the top plate is provided with clearances for the printing head, for lower transport rollers lying ahead of and behind the printing head in the feeding direction of the print carrier, if appropriate for coupling means, assigned to the transport rollers, for coupling with the functional components arranged in the housing cover, and for at least one drive pin for the ink ribbon cassette. In this case, according to the invention, the clearance for the printing head, which is formed by a slot extending at least over the print line width, is arranged in a rear part, in the feeding direction of the print carrier, of the depressed region, not covered by the inserted ink ribbon cassette. The clearances for the transport rollers lying ahead of the printing head are, according to the invention, arranged in a region of the depression covered by the inserted ink ribbon cassette, the ink ribbon cassette itself being provided with clearances for the passage of these transport rollers.

In a further development of the invention, it is provided that the ink ribbon cassette is provided with guide webs at the sides with respect to the feeding direction of the print carrier, for the lateral guidance of the print carrier, these lateral guide webs in each case being aligned with corresponding side webs arranged on the non-depressed region of the top plate.

According to a development of the invention, the housing cover is connected to the lower housing part pivotably about a pivot axis lying transversely to the feeding direction of the print carrier and parallel to the print carrier plane; spring means are provided, by which the housing cover is preloaded into its position lying on the lower housing part. Due to the spring means, the upper transport rollers are made to bear with a predetermined, given force against the lower transport rollers or against a print carrier located between the transport rollers, different thicknesses of the print carrier automatically being taken into account by the resulting different settings of the housing cover.

In a further development of the invention, it is provided that the housing cover is designed for receiving additional printing stations, which in each case comprise a paper supply roller as well as a paper transport device with transport rollers and transport drive for the transport of the paper from the paper supply roller along the printing abutment. In this way, the basic version of the printer can be upgraded by one or more printing stations, the print carriers to be printed of all the printing stations being guided over the printing abutment arranged in the housing cover and printed by the single printing head, as explained in more detail with reference to an illustrative embodiment. In this way, it is possible to design the printer, for example, as a cash-till printer which at the same time prints a voucher, a daybook strip and a receipt.

The flat design of the printer which can be achieved with the aid of the measures according to the invention makes it possible, moreover, to provide underneath the printer an additional add-on housing for receiving additional electrical and/or electronic components, without exceeding an ergonomically acceptable overall height; for this purpose, according to the invention the bottom of the lower housing part is removable, so that the electronic control device of the printer can be connected to the electronics of the add-on housing by internal connections. The add-on housing may receive, for example, PC hardware, to which all that has to be connected by means of plugs are standard devices such as a display, keyboard and till drawer and/or special electronic subassemblies, which turn the printer into a complete cash register.

In the case of a printer having a housing cover pivotably connected to the lower housing part wherein the housing cover is connected to the lower housing part pivotably about a pivot axis lying transversely to the feeding direction of the print carrier and parallel to the print carrier plane, there is the problem that the distance between the transport rollers remote from the pivot axis and their abutments is generally greater than in the case of the transport rollers closer to the pivot axis. To compensate for this effect, the upper transport rollers are arranged in the housing cover and interact with the lower transport rollers, and the lower and/or upper transport rollers lying behind the printing head in the feeding direction of the print carrier are softer than the transport rollers lying ahead of the printing head; or in that the upper transport rollers are mounted on a housing cover so as to be movable essentially perpendicularly to the print carrier plane, in the case of the operating position of the housing cover lying on the lower housing part, and are pretensioned by spring means toward the print carrier plane. These measures are particularly simple in terms of design. The more elaborate, but technically more satisfactory arrangement where the upper housing cover has an operating position lying on the lower housing part which is irrespective of the print carrier thickness can be provided. The upper transport rollers and the printing abutment can be arranged on a carrier which, in this operating position, is adjustable essentially perpendicularly to the print carrier plane and is preloaded by spring means toward the print carrier plane and the carrier can be arranged on the housing cover by means of an articulated scissors arrangement, or the carrier can be connected to the housing cover by means of a parallel link arrangement, or the carrier can be connected to the housing cover by means of a longitudinal guide.

In principle there is the possibility, if there is a plurality of printing stations, to provide independent paper transport drives for the individual stations, in particular for the stations arranged on the one hand in the lower housing part and the stations located on the other hand in the housing cover. A further simplification and reduction in the expense is obtained, however, by arranging the drives for the paper transport devices of the additional printing stations in the housing cover having upper coupling means which are connected to these paper transport devices and, with the housing cover lying on the lower housing part, enter into coupling engagement with lower coupling means arranged in the lower housing part and connected to a drive motor. As a result, in a similar way to the upper transport rollers, the paper transport devices of the printing stations located in the housing cover can also be driven by a drive motor arranged in the lower housing part.

In order to prevent an unintended lifting-off of the ink ribbon cassette laid on the lower housing part, holding means are provided, by which the cassette is held in its operating position in a simple way wherein on the upper front edge of the lower housing part on the one hand and on the lower edge of the ink ribbon cassette facing this upper front edge, the cassette laid on the lower housing part on the other hand there are provided hinging means. The hinging means can be brought into engagement with one another and can be released from one another when the ink ribbon cassette is pivoted up with respect to the upper side of the lower housing part, and are connected unreleasably to one another when the ink ribbon cassette is pivoted down onto the upper side. Means for holding down the front end of the ink ribbon cassette, in the feeding direction, can be provided on the printer, and wherein on the housing cover there are provided holding-down surfaces which, in the case of the position of the housing cover lying on the lower housing part, the surfaces come into contact with counter surfaces of the ink ribbon cassette lying on the lower housing part.

The abutments for the lower transport rollers may be designed as rollers or as sliding pieces, the lower transport resistance of rollers being at the expense of a somewhat more complex construction. The abutments may be arranged rigidly or resiliently on the housing cover or else in the described way by means of parallel-guided carriers. In a further development of the invention it is provided that the abutments are also arranged on the lower housing part, so that a complex design taking into account different pivoting angles of the housing cover is not required. In a further illustrative embodiment, it is provided that the transport roller abutments are arranged on an independent rocker, pivotably mounted on the lower housing part.

In order to rule out distortion of the device even if, for example, the printer is set up on an uneven support surface, and to ensure a parallel alignment of the housing cover with respect to the lower housing part, a link spindle, parallel to the pivot access, is rotatably mounted in the end region of the housing cover remote from the pivot access of the housing cover, and in that at each of the two ends of the link spindle there is fastened a parallel link having a guide groove, running in its longitudinal direction, for the engagement therein of a guide pin arranged on the housing lower part, is provided.

The housing cover can have a print carrier guide channel, which has a first run-in section, aligned in extension of the print carrier plane, and a run-out section, adjoining and bent out of the direction of the run-in section which serve the object of reducing the overall length of the printer. In this case, the run-out section is preferably provided behind the printing station in the transporting direction of the print carrier; if use is made, for example, of bottom-glued multiply print carriers, a displacement of the plies with respect to one another is no longer harmful.

A further measure for shortening the overall length of the printer provides an arrangement wherein the front end face of the lower housing part is designed as an installation surface for an ink ribbon cassette, and in that guides are provided for the ink ribbon section running outside the ink ribbon cassette, which guide the ink ribbon between printing head and printing abutment.

An outlet slot for the outlet of a receipt paper strip is formed in a separating joint between the housing cover and a housing part which can be pivoted down in relation to the latter. A receipt cutting-off device is provided having a cutting knife, which is movable in the housing cover or the housing part which can be pivoted down, and a counter-knife, which is fixedly arranged on what is respectively the other part. The arrangement serves the object of making the transport channel for the printing paper of a receipt printing station, at the end of which the cutting knife is arranged, more easily accessible. Due to the arrangement of the cutting knife on the one hand and the counter-knife on the other hand, in parts of the printer which can be separated from each other, the loading of new printing paper in particular is also facilitated.

Several illustrative embodiments of the invention are described in more detail below.

DETAILED DESCRIPTION OF THE PREFERRED EMBODIMENTS

Figure 1:
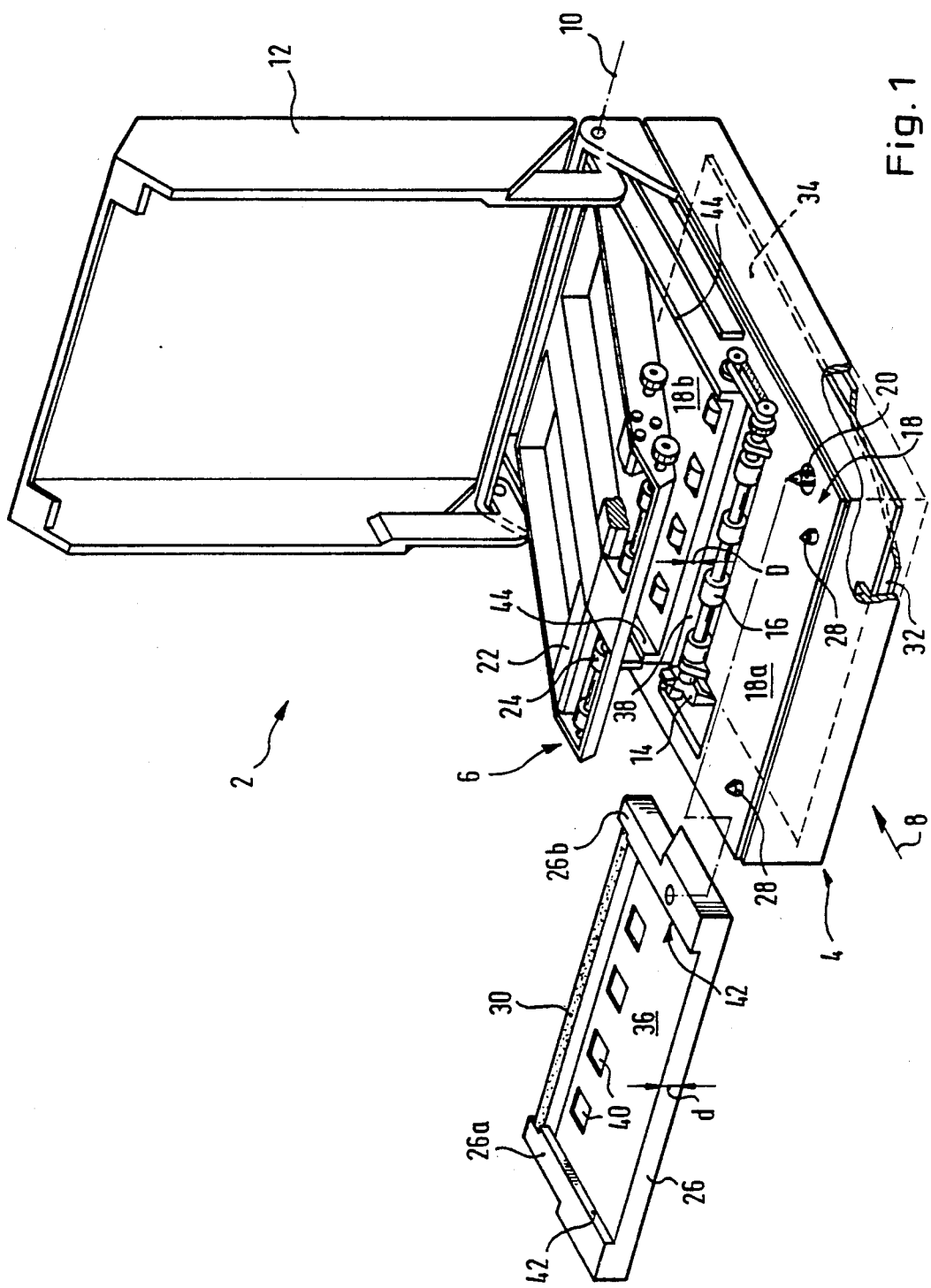
FIG. 1 is a perspective, partially sectioned representation of a printer in a basic version with lifted-off housing cover and opened housing lid.

The printer 2 represented in FIG. 1 essentially comprises a lower housing part 4 as well as a housing cover 6 which can be placed on or lifted off the latter. The separating plane between the lower housing part 4 and the housing cover 6 essentially coincides with the print carrier plane, i.e., with the plane in which a print carrier is transported in the printer 2. The housing cover 6 is mounted pivotably on the lower housing part 4 about a pivot axis 10 lying transverse to the feeding direction 8 of a print carrier and parallel to the print carrier plane.

A lid 12, likewise arranged pivotably about the pivot axis 10 on the lower housing part 4 serves the purpose of covering and closing the printer 2 when housing cover 6 is resting on the lower housing part 4.

The lower housing part 4 receives the electronic drive and control device as well as the associated active functional components of the printer, such as the printing head 14, which can be moved transversely to the feeding direction 8 in the line direction, lower transport rollers 16 for print carrier transport as well as drive means for ink ribbon transport, of which in FIG. 1 only a drive pin 20 protruding through the top plate 18 is represented.

In the case of the basic version of the printer represented in FIG. 1, the housing cover 6 essentially receives only inactive components, namely the printing abutment 22, extending over the entire print line length, as well as upper transport rollers 24, which are drive-connected by coupling means, still to be described, to the lower transport rollers 16.

As FIG. 1 reveals, the top plate 18 has a depressed region 18a, at the front in the feeding direction 8, and a rear region 18b, lying higher with respect to said depressed region. The ink ribbon cassette 26 is laid flat onto the depression or the depressed region 18a of the top plate 18, two centering pins 28, projecting from the top plate 18, engaging in two centering holes (not shown) of the ink ribbon cassette 26 and aligning and holding the latter in the correct position. The drive pin 20, connected to an ink ribbon drive, is connected to transport rollers which are arranged inside the ink ribbon cassette 26 and effect the ink ribbon transport in a way which is known and therefore not described in any more detail. The ink ribbon cassette 26 has, in a likewise known way, two forward-projecting arms 26a and 26b, between which the ink ribbon 30 extends freely outside the ink ribbon cassette 26. With ink ribbon cassette 26 laid onto the top plate 18, the ink ribbon 30, turned into the writing plane by suitable deflecting means, runs along the path of movement of the printing head 14, so that a print carrier located between the ink ribbon 30 and the printing abutment 22 can be printed on.

The bottom 32 of the lower housing part 4 is removable. As a result, on the one hand a circuit board 34, arranged over the bottom 32 and receiving the electronic drive and control device, is easily accessible from below. On the other hand, there is the possibility of arranging on the underside of the lower housing part, in a way represented with reference to FIG. 5, an add-on housing for receiving additional electrical and/or electronic components, which can then be connected by means of internal connections directly to the circuit board 34. The thickness d of the ink ribbon cassette corresponds to the dimension D, by which the region 18a of the top plate 18 is depressed with respect to the region 18b. With ink ribbon cassette 26 laid onto the top plate 18, the upper side 36 of said cassette is accordingly flush with the region 18b of the top plate 18 and serves as support surface for a print carrier to be drawn into the printer.

In the region of the transition from the depressed region 18a to the elevated region 18b of the top plate 18 there is provided a clearance 38, through which the mouth of the printing head 14 protrudes. The clearance 38 has the shape of a slot extending at least over the print line length. The dimensions of the ink ribbon cassette 26 are such that it does not cover over the region of the clearance through which the mouth of the printing head 14 protrudes, so that the printing head has access to the print carrier transported over the clearance 38. For the lower transport rollers 16, lying ahead of the writing region, independent clearances may be provided. As FIG. 1 reveals, the clearance 38 in the present illustrative embodiment is, however, so large that these lower transport rollers 16 also protrude upwards through said clearance. Since the rear part, in the feeding direction 8, of the ink ribbon cassette 26 covers the region of the clearance 38 through which the lower transport rollers protrude, there are formed in the ink ribbon cassette 26 passage openings 40 through which the lower transport rollers 16 also protrude by a small amount, so that they can enter into transporting engagement with a print carrier lying on the upper side 36 of the ink ribbon cassette 26.

The ink ribbon cassette 26 is provided with lateral guide webs 42 for the lateral guidance of a print carrier resting on the upper side 36, which webs continue in lateral guides 44 assigned to the elevated region 18b.

As can be seen in FIG. 1, the clearance 38 is lengthened on its side on the left in FIG. 1 beyond the print line length, so that the printing head 14 can travel into a rest position, which lies outside the print carrier width defined by the lateral guides 42 and 44. The clearance 38 is widened in the region of the rest position, so that the printing head 14 is easily accessible for servicing purposes.

The printer 102 represented in FIG. 2 corresponds in the region of the lower housing part 104 exactly to the printer 2 already described with reference to FIG. 1, so that in this respect a renewed description can be dispensed with.

As in the example according to FIG. 1, the housing cover 106 includes upper transport rollers, which can be coupled to the lower transport rollers 116, as well as a printing abutment extending over the entire print line length, although this is not shown in any further detail. Moreover, on the housing cover 106 there are arranged two additional printing stations 150 and 152, which upgrade the printer 102 to a cash-till printer which can print a voucher as well as additionally a receipt and a day-book strip respectively in the lower printing station, described with reference to FIG. 1. The printing station 150 comprises a paper supply roller 154 as well as a paper transport device (not shown in any more detail), by which the paper 156 drawn off the paper supply roller 154 is transported underneath the printing abutment (not shown) and to the take-up roller 158. The paper strip 156 serves in a known way as cash-till day-book.

Figure 2:
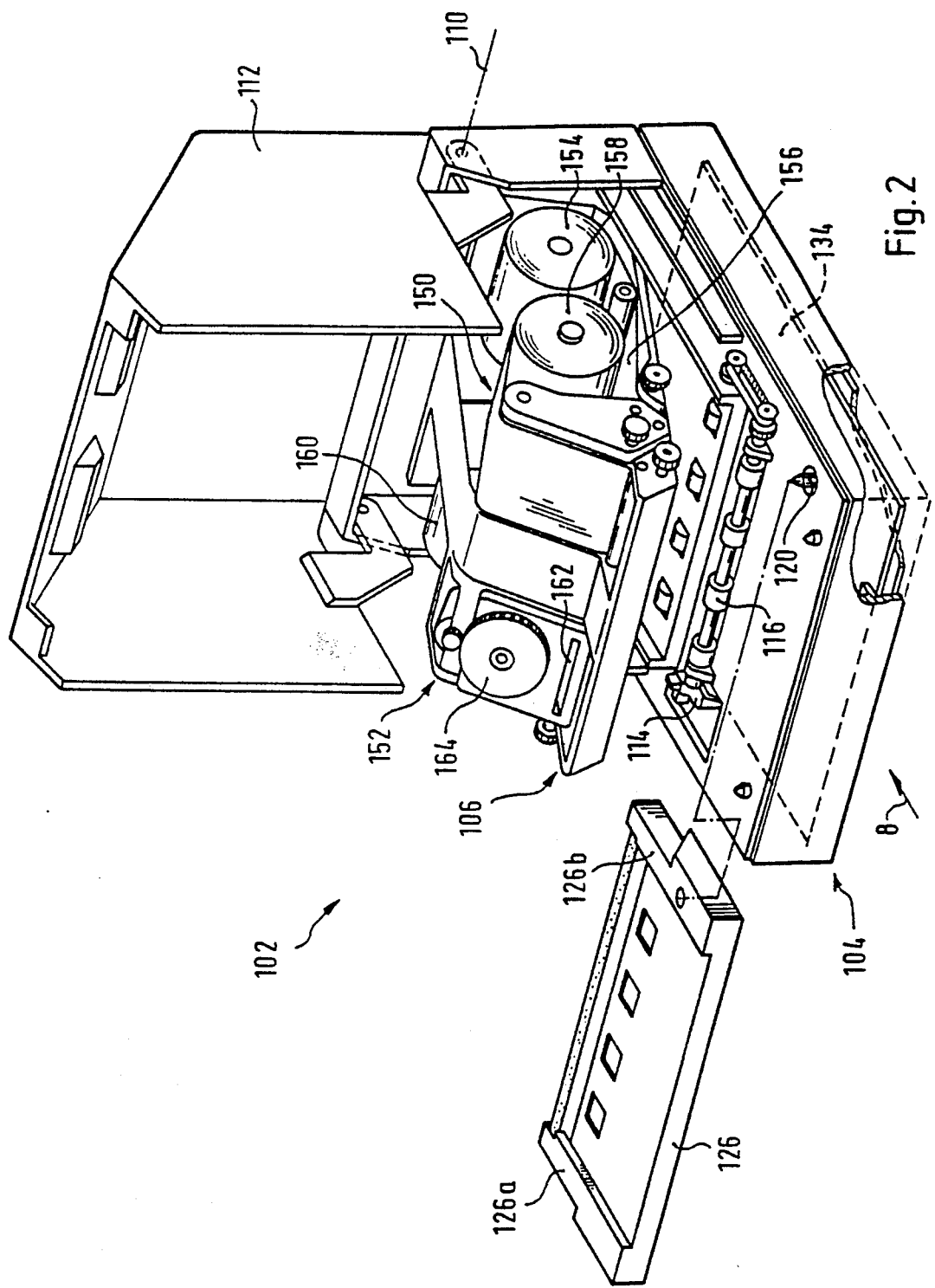
FIG. 2 is a perspective partially sectioned representation of a printer upgraded by two additional printing stations, approximately according to FIG. 1.

The printing station 152 likewise comprises a paper supply roller 160 and a paper transport device (not shown) which guides the paper drawn off the paper supply roller 160 underneath the printing abutment (not shown) and to a delivery slot 162, where it is cut off by a cutting device, of which only a drive gear wheel 164 is represented in FIG. 2.

It can be seen that both the print carriers, for example preprinted receipts, drawn into the lower printing station in the direction of the arrow 8 corresponding to FIG. 1, and the paper drawn off the paper supply rollers 154 and 160 are in each case guided along underneath the printing abutment arranged in the housing cover 106, so that the vouchers, the day-book and the receipts can be printed by the single printing head 114.

As in the example of FIG. 1, the housing cover 106 is pivotable about a pivot axis 110 with respect to the lower housing part 104, so that it can be pivoted out of the lifted-off position represented in FIG. 2 into a position resting on the lower housing part 104, the lower transport rollers 116 coming into contact with the upper transport rollers (not shown) arranged in the housing cover 106.

A lid 112 serves for covering the printer.

The ink ribbon cassette 126 represented in FIG. 2 corresponds to the ink ribbon cassette 26 represented in FIG. 1. It should be noted that, in the event that the format of the vouchers drawn in over the ink ribbon cassette 126 so require, the lateral guide webs 126a and 126b may also have a smaller distance from each other than that represented, in order that they can perform their guide functions. Incidentally, it is also possible to make vouchers of smaller width come to bear against one of the lateral guide webs.

Figure 3:
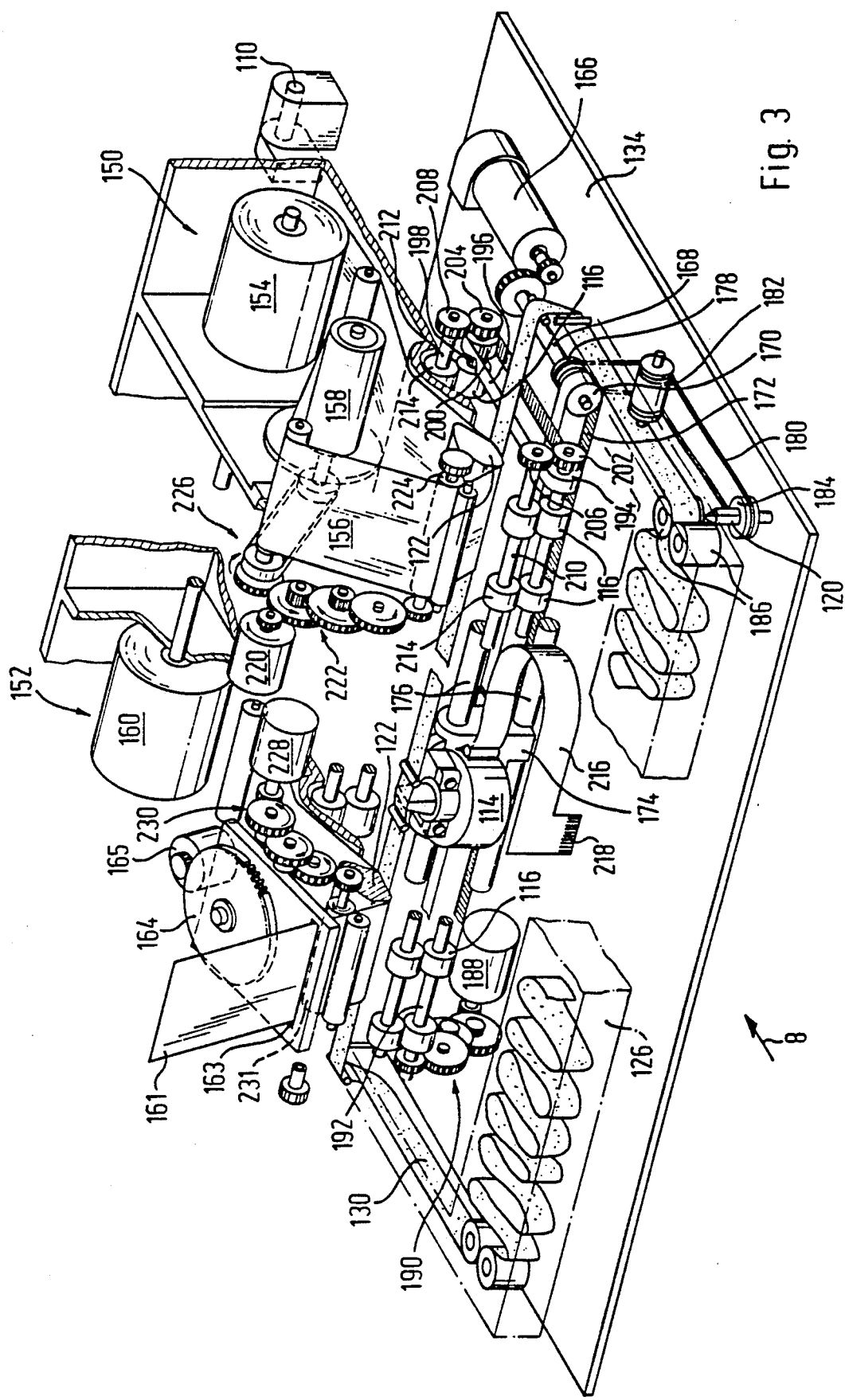
FIG. 3 is a perspective partially sectioned representation of a printer approximately according to FIG. 2, housing parts and lid having been omitted.

FIG. 3 shows a printer approximately according to FIG. 2, the housing and other details blocking the view of essential functional components having been omitted for reasons of a clearer overall representation.

All essential functional components belonging to the basic version of the printer are fastened, to be precise, preferably by means of plug connections, directly on a circuit board 134, which contains the electronic drive and control device. A printing head drive motor 166 drives a drive shaft 168, the free end of which bears a deflecting and driving wheel 170 for the drive of an endless drive belt 172, extending in the print line direction. This drive belt 172 is connected in a way known per se to a carrier 174, which is mounted displaceably on guide rods 176 extending in the print line direction. The carrier 174 bears the printing head 114.

The drive shaft 168 bears an additional drive wheel 178 for the drive of a drive belt 180, which is guided by means of a deflecting roller arrangement 182 and a deflecting wheel 184, connected to a drive pin 120. The deflecting roller arrangement 182 may be designed, for example, as a one-way coupling, which has the effect that the drive pin 120 is in each case driven only in the forward movement or the return movement of the printing head 114. As already explained with reference to FIG. 1, the drive pin 120 serves for driving drive rollers 186, arranged in the ink ribbon cassette 126, for the drive of an ink ribbon 130.

By means of a gear arrangement 190, a paper transport motor 188 drives a drive shaft 192, which bears the lower transport rollers 116, lying ahead of the printing region in the feeding direction 8. The drive shaft 192 is coupled by means of a drive wheel 194, arranged on its right-hand end, a drive belt 196 and a drive wheel 200, arranged on a drive shaft 192, to the drive shaft 198, which bears the lower transport rollers 116 lying behind the writing region in the feeding direction. Accordingly, the paper drive motor always drives the lower transport rollers 116 lying ahead of and behind the writing region simultaneously.

Arranged on the right-hand ends of the drive shafts 192 and 198 in FIG. 3 are gear wheels 202 and 204, respectively. With housing cover placed on the lower housing part, these in each case mesh with gear wheels 206 and 208, respectively, which are arranged on drive shafts 210 and 212 rotatably mounted on the housing cover. The drive shafts 210 and 212 bear upper transport rollers 214 arranged respectively ahead of and behind the writing region. With housing cover placed on the lower housing part, the upper transport rollers 214 come into contact with the lower transport rollers 116 or with print carriers located between these transport rollers.

The printing head 141, which can travel in the print line direction, is electrically connected by means of a flexible cable 216 and a plug connector 218, arranged on the end of the latter, to the circuit board 134.

The printing station 150 for the day-book printing is equipped with a drive device for the paper transport, which device comprises a drive motor 220 as well as a gear arrangement 222, which is drive-connected to the latter and drives a drive roller 224 which interacts with a counter-roller and over which the paper 156 drawn off the paper supply roller 154 runs. From the gear arrangement 222 there branches off a further gear arrangement 226, which drives the take-up roller 158. It can be seen that the paper 156 is guided along underneath the printing abutment 122, arranged in the housing cover, so that it can be printed on by the printing head 114.

The printing station 152 for receipt printing is equipped with a drive device for the paper transport, which device comprises a drive motor 228 and a gear arrangement 230 which is drive-connected to the latter and drives a drive roller 231 which interacts with a counter-roller and over which the paper 161 drawn off the paper supply roller 160 is guided. Once a printing operation has been completed, the paper 161 is cut off by a cutting device (not shown in any more detail), of which in FIG. 3 a drive gear wheel 164 and a drive motor 165, drive-connected to the latter, are shown; the receipt is delivered through a delivery slot 163.

The electrically or electronically driven functional components of the printing stations 150 and 152 are connected by means of cable connections (not shown in any more detail) to the circuit board 134. These cable connections are preferably laid such that they run from the printing stations 150 and 152 to the region of the pivot axis 110 and from there to the circuit board 134, so that during pivoting of the housing cover essentially no lengthening or shortening of the cable route occurs.

Figure 4:
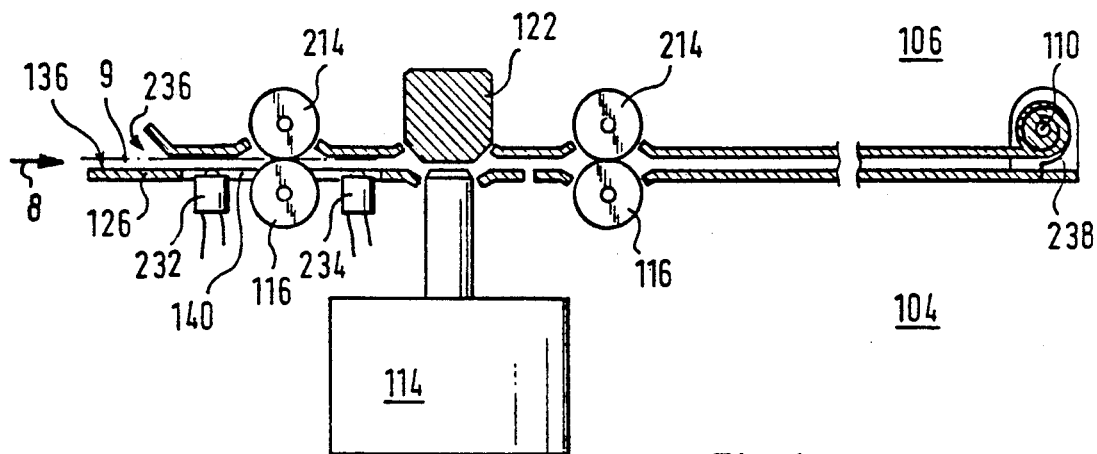
FIG. 4 is a schematical longitudinal section through a printer approximately according to FIG. 3 in the region of the print carrier plane.

FIG. 4 diagrammatically shows a longitudinal section through a printer approximately according to FIG. 3 in the region of the print carrier plane. The printing head 114 is arranged in the lower housing part 104 such that it can travel perpendicularly to the plane of the drawing in the print line direction. The housing cover 106, mounted pivotably on the lower housing part 104 about the pivot axis 101, bears the printing abutment 122. The lower transport rollers 116, arranged ahead of and behind, with respect to the feeding direction 8 for a print carrier 9, the writing region defined by the printing head 114, are connected to a transport motor in the way described in more detail with reference to FIG. 3. With the housing cover placed on the lower housing part, the upper transport rollers 214, assigned to the lower transport rollers 116 and mounted in the housing cover 106, are connected to the lower transport rollers 116, as likewise described with reference to FIG. 3.

The support surface for the print carrier 9, arranged ahead of the printing head 114 with respect to the feeding direction 8, is formed by the upper side 136 of the ink ribbon cassette 126. The upper top wall, represented in FIG. 4, of the ink ribbon cassette 126 is provided with passage openings 140, through which the lower transport rollers 116, lying ahead of the writing region, protrude. As FIG. 4 further shows, there are arranged moreover in the passage opening 140, ahead and behind the transport roller 116, sensors 232 and 234, respectively, which signal to the electronic control device whether a print carrier 9 is present or not. The sensors 232 and 234 in conjunction with the front transport roller pair 116, 214 in the feeding direction 8, replace a stop which is customary in the case of earlier printers and against which the print carrier initially came to bear and was consequently aligned. In the present case, the stop is formed by the line of contact of the transport rollers 116, 214. If a print carrier is pushed from the left into the feed shaft 236, it comes to bear against this contact line. The print carrier leading edge is in this case registered by the first sensor 232, which after expiry of a delay time starts the drive motor for the drive of the lower transport roller 116, so that the print carrier is transported in the feeding direction 8. The sensor 234 arranged behind the transport roller pair likewise registers the running-through of the print carrier leading edge and emits a reference signal for the line control. When the second sensor 234 emits its signal, the print carrier has already been safely taken up by the front transport roller pair. Thus, any slipping when taking up the print carrier by the front transport roller pair does not result in line displacements.

As described, the housing cover 106 is preloaded, for example by a spiral spring 238, arranged in the region of the pivot axis 110, in such a way that it is pressed into the position represented in FIG. 4, resting on the lower housing part 104. As a result, the upper transport rollers 214 come to bear with a force given by the spiral spring 238 on the lower transport rollers 116 or a print carrier 9 resting on the latter, so that the print carrier thickness is automatically taken into account and the distance between the printing abutment 122 and the mouth of the printing head 114 is set correspondingly.

Figure 5:
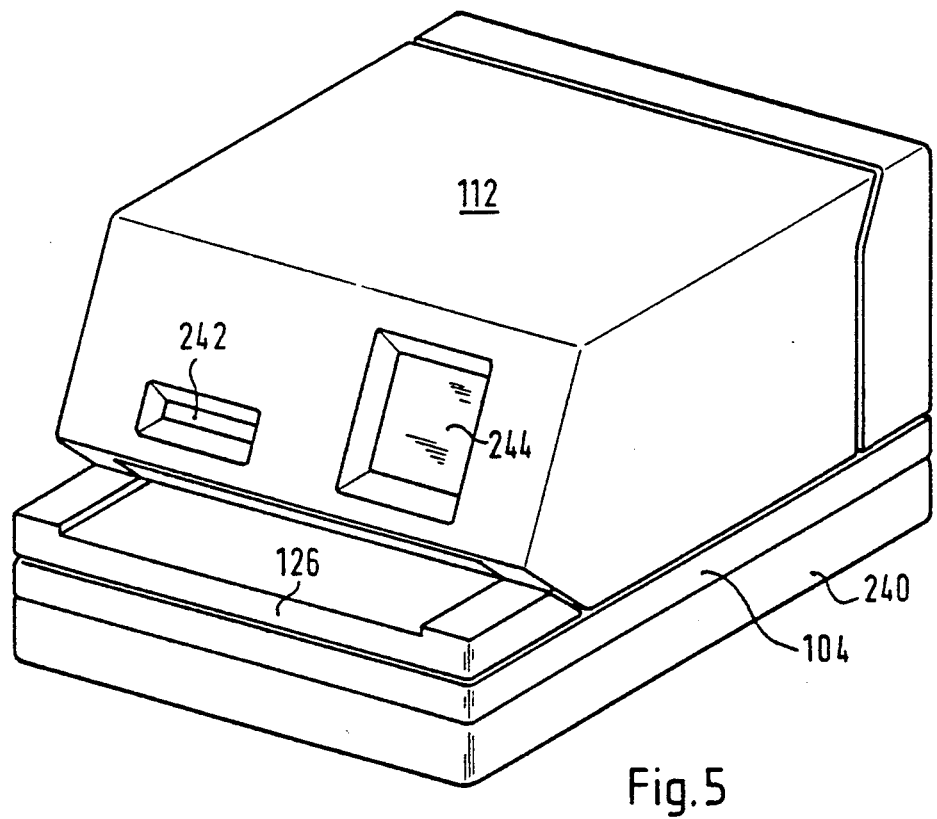
FIG. 5 is a perspective view of a printer approximately according to FIG. 2 with placed-on upper housing part and closed housing lid as well as with add-on housing constructed underneath.

FIG. 5 shows a printer approximately corresponding to FIG. 2 in the state ready for operation. As cannot be seen, the housing cover has been lowered onto the lower housing part; the lid 112 is closed. An ink ribbon cassette 126 has been laid on the front part of the lower housing part 104.

Arranged under the lower housing part 104 is an add-on housing 240 for receiving additional electrical and/or electronic components. Since, as described with reference to FIG. 11, the bottom of the upper housing part 104 is removable, there is the possibility of connecting the parts of the add-on housing 240 to the circuit board 134 by direct internal connections. Accommodated in the add-on housing 240 are, for example, the electronic modules of a personal computer, to which all you need to do is use plugs to connect standard devices, such as a display, keyboard etc, and/or special electronic subassemblies which turn the printer into a complete cash register and to which, for example, a till drawer is connected. The delivery slot 242, formed on the front panel of the lid 121, serves for delivering the receipt (see FIG. 3), the current imprint on the daybook paper 156 can be seen through the viewing window 244.

In the case of the illustrative embodiment represented in FIG. 4, the upper transport rollers 2141, arranged ahead of the printing abutment, are further removed from the pivot axis 110 of the housing cover than the upper transport rollers, lying behind the printing abutment 122. This has the consequence that, during every pivoting of the housing cover with respect to the lower housing part, the front transport rollers have a greater distance from each other than the rear transport rollers. In particular when transporting thicker print carriers, for example multiply forms, there is on the one hand the risk that the front transport rollers come out of transporting engagement and that the distance between the printing abutment 122 and the printing head 114 becomes too great. It is possible to compensate for this drawback by, for example, the transport rollers arranged behind the printing abutment being produced from a softer material than the transport rollers arranged ahead of the printing abutment.

Another possibility of avoiding the effects described above is to arrange the upper transport rollers on a carrier which, for its part, is arranged adjustably on the housing cover, by means of parallel guides or the like, in such a way that, with housing cover resting on the lower housing part, the front and rear transport rollers are uniformly adjustable perpendicularly to the print carrier plane.

Figure 6:
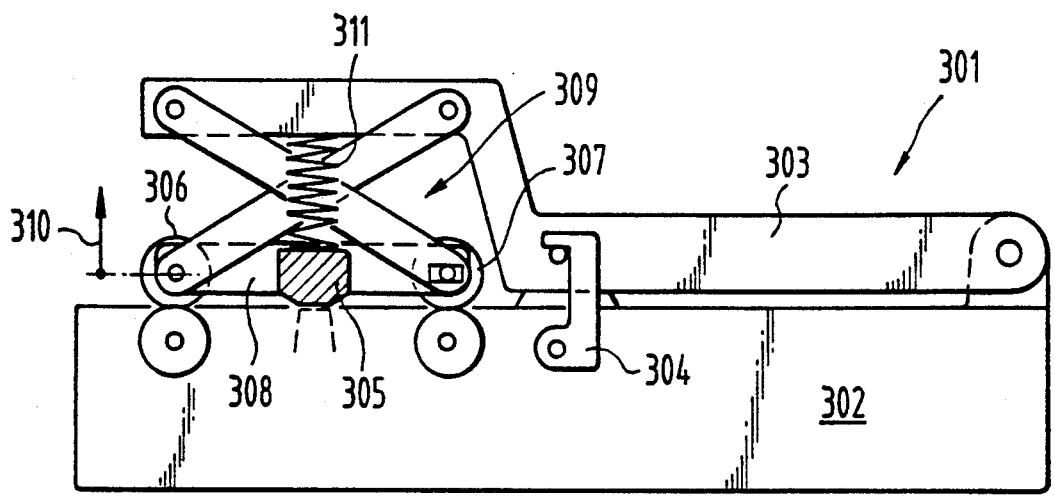
FIGS. 6 to 11 are schematic sectional views of various developments for a parallel or approximately parallel guidance of upper transport rollers in the housing cover.

FIG. 6 diagrammatically shows a printer 301 with a lower housing part 302 and a housing cover 303 pivotably connected to the latter. The housing cover 303 can be arrested by means of a pawl 304 in the operating position represented in FIG. 6 in which it rests on top. The printing abutment 305, the upper transport rollers 306, arranged ahead of the latter, and the upper transport rollers 307, arranged behind the printing abutment, are arranged on a common carrier 308. The carrier 308 is mounted on the housing cover 303 adjustably in the direction of the arrow 310 by means of an articulated scissor arrangement 309. Said carrier is preloaded in the direction opposed to the arrow 310 by a compression spring 311 arranged between the carrier 308 and the housing cover 303. With the aid of this arrangement, the printing abutment 305 and the upper transport rollers 306 and 307 arranged ahead of and behind the latter are always adjusted uniformly and parallel to one another perpendicularly to the print carrier plane.

Figure 7:
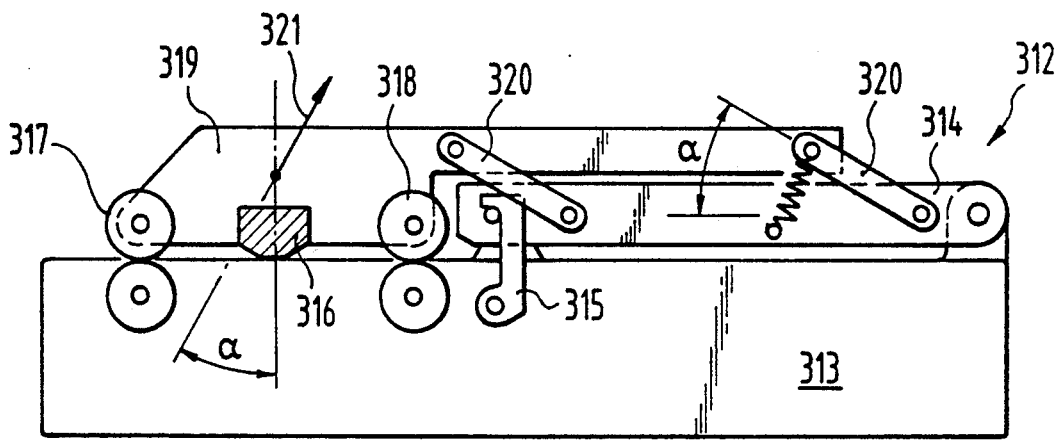

FIG. 7 in turn shows a printer 312 with a lower housing part 313 and a pivotable housing cover 314, which can be held in its operating position by a pawl 315. The printing abutment 316 as well as the transport rollers 317 and 318, arranged ahead of and behind the latter, are arranged on a carrier 319, which is mounted adjustably on the housing cover 314 by means of two parallel links 320. When the carrier 319 is lifted off upwards by a print carrier guided through between the transport rollers, it moves approximately tangentially to the alignment of the parallel links 320, i.e., in the direction of the arrow 321. In this way, the printing abutment 316 and the transport rollers 317 and 318 arranged ahead of and behind the latter are always lifted off uniformly and in parallel. The fact that the carrier 319 is not lifted off perpendicularly but at an angle to the print carrier plane can be ignored in the case of small lifting-off distances.

Figure 8:
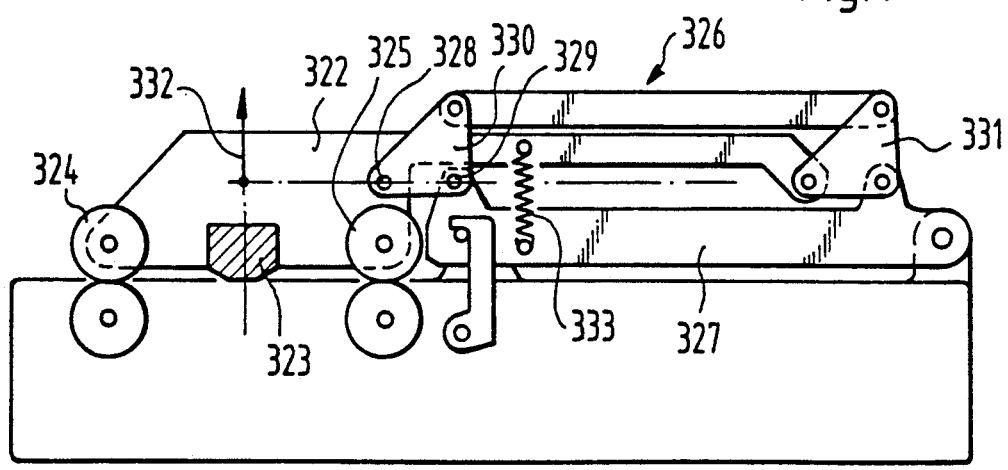

FIG. 8 shows an illustrative embodiment in which a carrier 322, on which there are provided a printing abutment 323 as well as transport rollers 324, 325 arranged ahead of and behind the latter, is connected to a pivotable housing cover 327 by means of a parallelogram link arrangement 326. The lifting-off movement of the carrier 322 is performed essentially perpendicularly to the joining line of the points of articulation 328, 329 of the front link 330 connecting the carrier 322 to the housing cover 327 (which front link corresponds to a rear link 331), i.e. in the direction of the arrow 332 and consequently essentially perpendicular to the front carrier plane. A tension spring 333, arranged between the carrier 322 and the housing cover 327 pretensions the carrier 322 in the direction of the print carrier plane.

Figure 9:
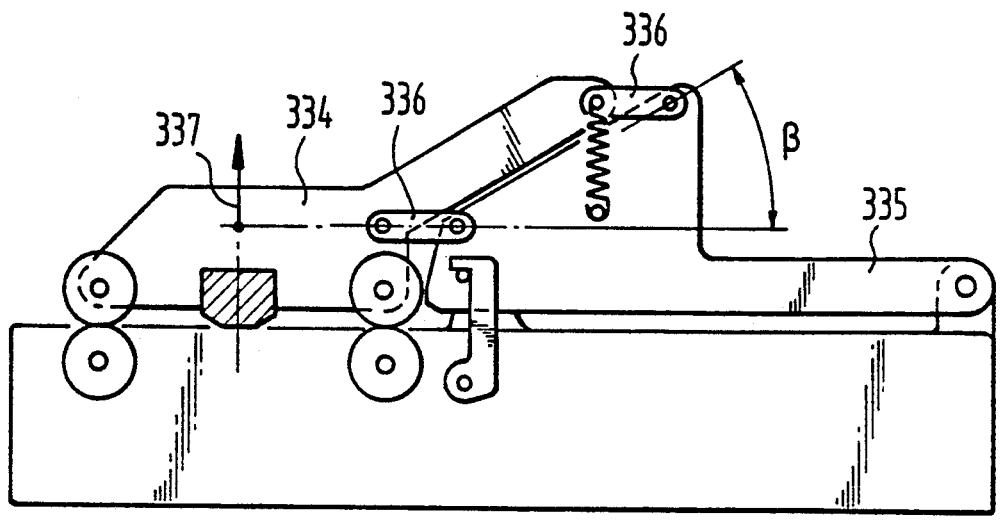

FIG. 9 shows an arrangement which corresponds essentially to that of FIG. 6, so that it does not have to be described once again in detail. As a difference from FIG. 6, however, the links 336, connecting the carrier 334 to the housing cover 335, are aligned essentially parallel to the print carrier plane, so that the carrier 334 is lifted off essentially perpendicularly thereto, i.e. in the direction of the arrow 337 standing perpendicularly on the print carrier plane.

Figure 10:
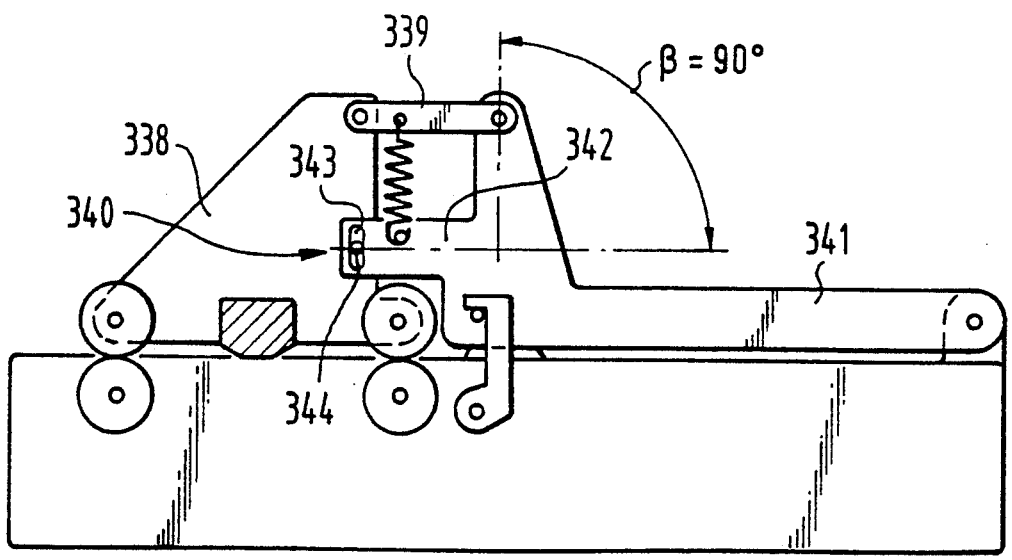

FIG. 10 shows an arrangement in which a carrier 338 is connected to a housing cover 341 by means of a link 339, essentially parallel to the print carrier plane, and a sliding guide 340, designed to correspond to the pivoting movement of the link 339. The sliding guide 340 essentially comprises a guide slot 343, which is formed on a holding arm 342 of the housing cover 341 and into which there engages a guide pin 343, arranged on the carrier 338. This arrangement also ensures a lifting-off movement which lies essentially perpendicularly to the print carrier plane.

Figure 11:
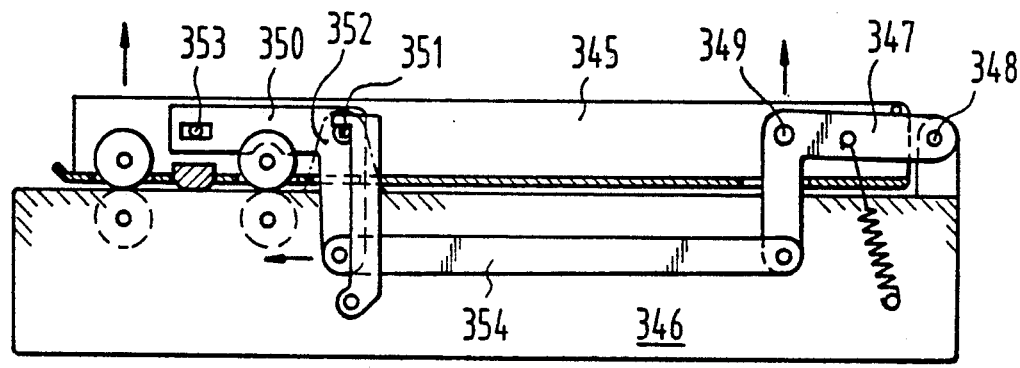

FIG. 11 shows an arrangement in which a housing cover 345 is connected to the lower housing part 346 not directly but by means of a parallelogram link arrangement. The horizontal arm of the rear angled link 347 is connected at the point of articulation 348 to the lower housing part 346 and at the point of articulation 349 to the housing cover 345. The horizontal arm of the front angled link 350 is mounted pivotably by means of its rear point of articulation 351 on a block 352 of the lower housing part 346. By means of the front point of articulation 353, the horizontal arm of the front angled link 350 is connected to the housing cover 345. If a print carrier runs through between the transport rollers, the front part of the housing cover 345 is lifted off upwards. In this case, the horizontal arm of the front angled link 350 is pivoted upwards about the point of articulation 351. By means of its vertical arm and the connecting link 354, it takes with it the vertical arm of the rear angled link 347, which is pivoted about its rear point of articulation 348 and, by means of the front point of articulation 349, also raises the rear region of the housing cover 345 to the extent that the latter remains parallel.

Figure 12:
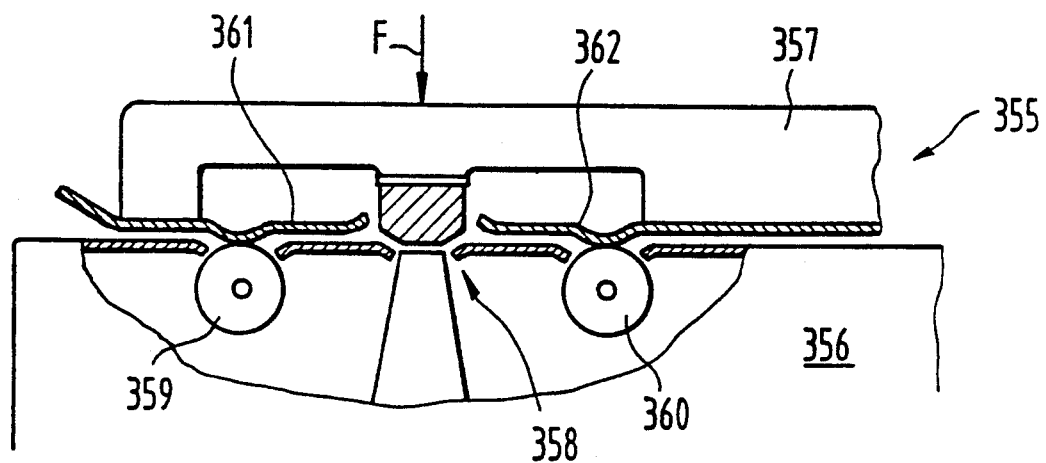
FIGS. 12 to 14 are schematic sectional views of various developments for transport roller abutments designed as sliding surfaces.

FIG. 12 diagrammatically shows an illustrative embodiment of a printer 355 with a lower housing part 356 and a housing cover 357 pivotably connected to the latter. In the lower housing part 356 there are provided driven transport rollers 359, arranged ahead of the printing station 358, as well as driven transport rollers 360, arranged after the printing station. The abutments for the transport rollers 359, 360 are formed by relatively rigid profiled sheet-metal plates 361, 362. In order to permit an adaptation to different print carrier thicknesses, a thickness compensating control is preferably provided, for instance of the type described with reference to FIG. 11.

Figure 13:
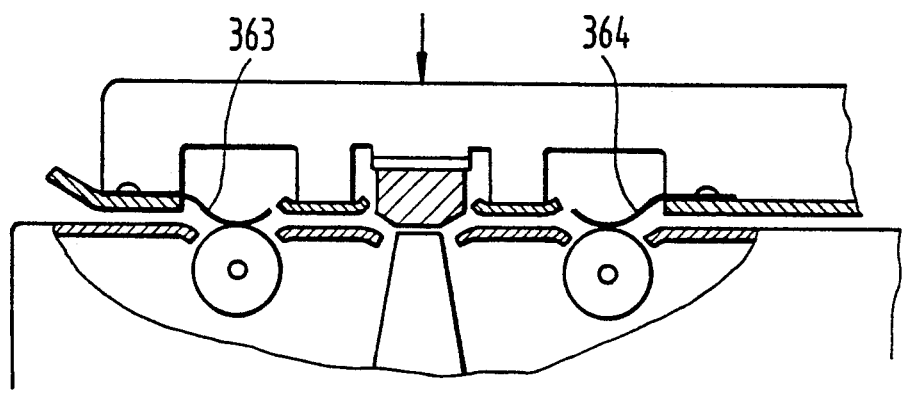

FIG. 13 shows a printer approximately according to FIG. 12, but resilient curved pieces 363, 364, which can yield resiliently in each case corresponding to the thickness of the transported print carrier, being provided instead of the rigid sheet-metal plates.

Figure 14:
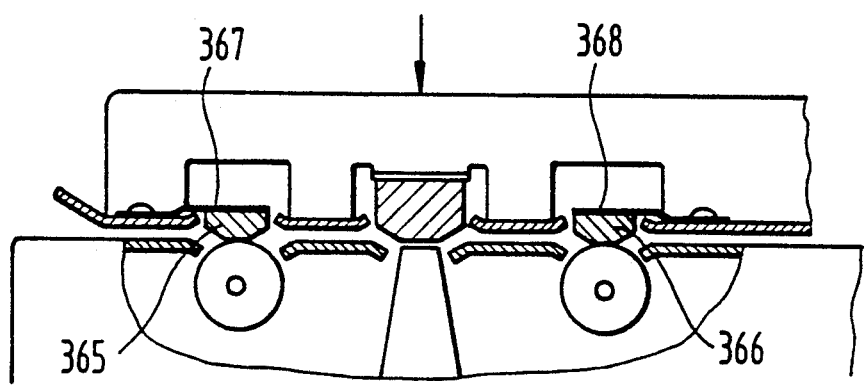

FIG. 14 shows an illustrative embodiment approximately according to FIG. 13, the printing abutments for the transport rollers being formed by separate sliding pieces 365, 366, which are pressed resiliently against the transport rollers by means of resilient holding arms 367, 368. This arrangement allows the sliding pieces 365, 366 on the one hand and the resilient holding arms 367, 368 on the other hand to be produced respectively from the materials best suited for the intended tasks. In the case of the configurations of FIGS. 13 and 14, a thickness compensating control is not required for the housing cover.

Figure 15:
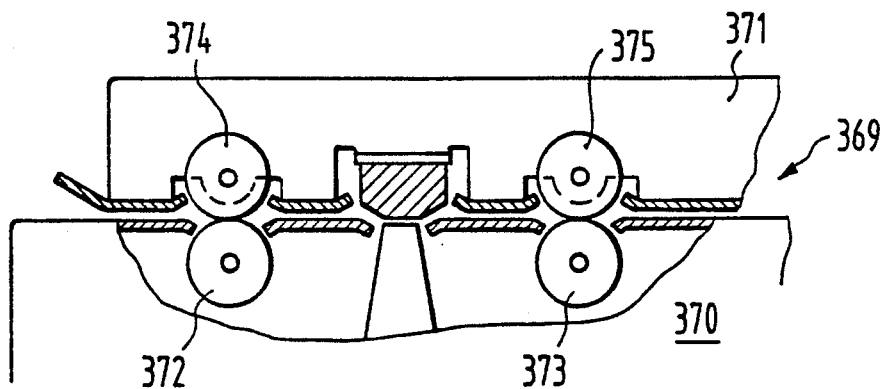
FIGS. 15 and 16 are schematic sectional views of various developments for idling upper transport rollers.

FIG. 15 diagrammatically shows a printer 369 with a lower housing part 370 and a housing cover 371 pivotably connected to the latter. In the case of this illustrative embodiment, the abutments for the lower transport rollers 372, 373 are designed as idling upper transport rollers 374, 375, fixedly arranged on the housing cover 371. In the case of this arrangement as well, a thickness compensating device is preferably provided, for instance of the type described with reference to FIG. 11.

Figure 16:
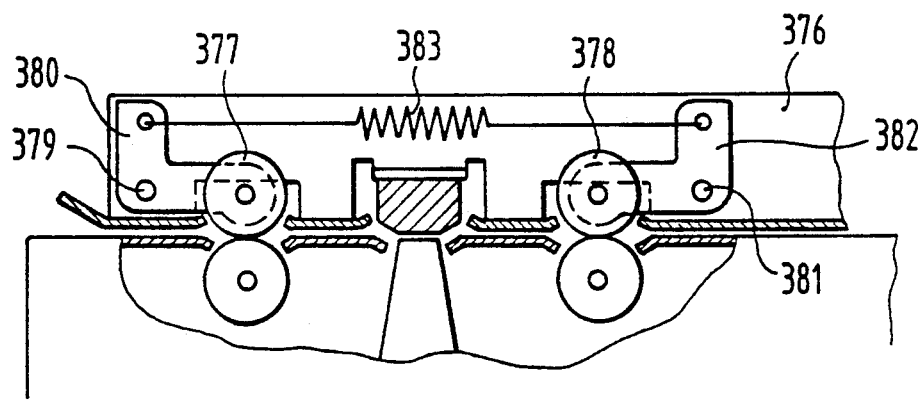

In FIG. 16, a printer approximately according to FIG. 15 is represented, the idling upper transport rollers 377, 378, arranged in the housing cover 376, not being arranged fixedly but resiliently. The left-hand transport roller 377 in FIG. 16 is arranged on an angled lever 380 which is mounted on the housing cover 376 pivotably about the point of articulation 379; in a corresponding way, the right-hand upper transport roller 378, in FIG. 16, is arranged on the angled lever 382 which is connected to the housing cover 376 pivotably at the point of articulation 381. The vertical arms of the angled levers 380, 382 are connected to each other by means of a tension spring 383 arranged between them. As a result, the upper transport rollers 377, 378 are pretensioned resiliently against the assigned lower transport rollers. In the case of this arrangement, a thickness compensating device for the housing cover 376 is not required.

Figure 17:
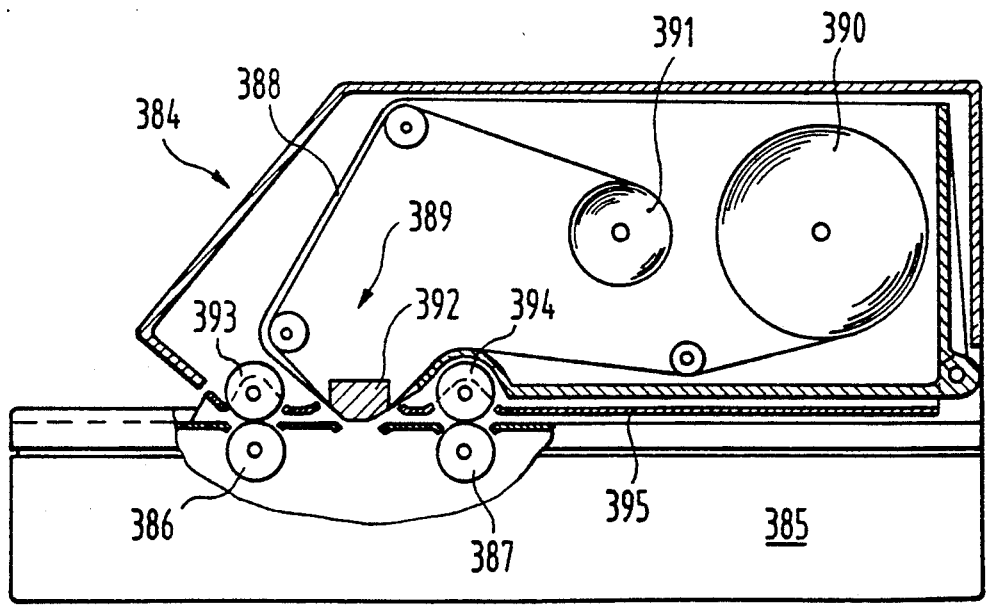
FIG. 17 is a schematic sectional view of an illustrative embodiment of upper transport rollers arranged on the lower housing part.

The printer 384 represented in FIG. 17 comprises a lower housing part 385, in which front and rear lower transport rollers 386 and 387, respectively, are arranged and are connected to a transport roller drive. A housing cover 388, arranged pivotably on the lower housing part 385, contains an upper printing station 389 with a paper supply roller 390 and a paper take-up roller 391. The printing abutment 392 for the printing head (not shown) arranged in the lower housing part, is arranged in the housing cover 388 and can be lifted off with the latter. The abutments for the lower transport rollers 386, 387 are designed as upper transport rollers 393, 394. According to a development, the upper transport rollers 393, 394 are a component part of the lower housing part 385; in this case, they are preferably arranged resiliently, for instance in the way described with reference to FIG. 15, so that they can adapt themselves to different print carrier thicknesses. In another development, the upper transport rollers 393, 394 are arranged on an independent rocker 395, which can pivot with respect to the lower housing part 385 and can be pivoted down separately from the housing cover 388. In this case, the rear transport rollers 387, 394 are preferably designed to be softer than the front transport rollers 386, 393, in the way described with reference to FIG. 4, in order that a proper mutual contact pressure of the front transport rollers 386, 393 as well as a proper printing distance between the printing abutment 392 and the printing head is ensured, as already described.

Figure 18:
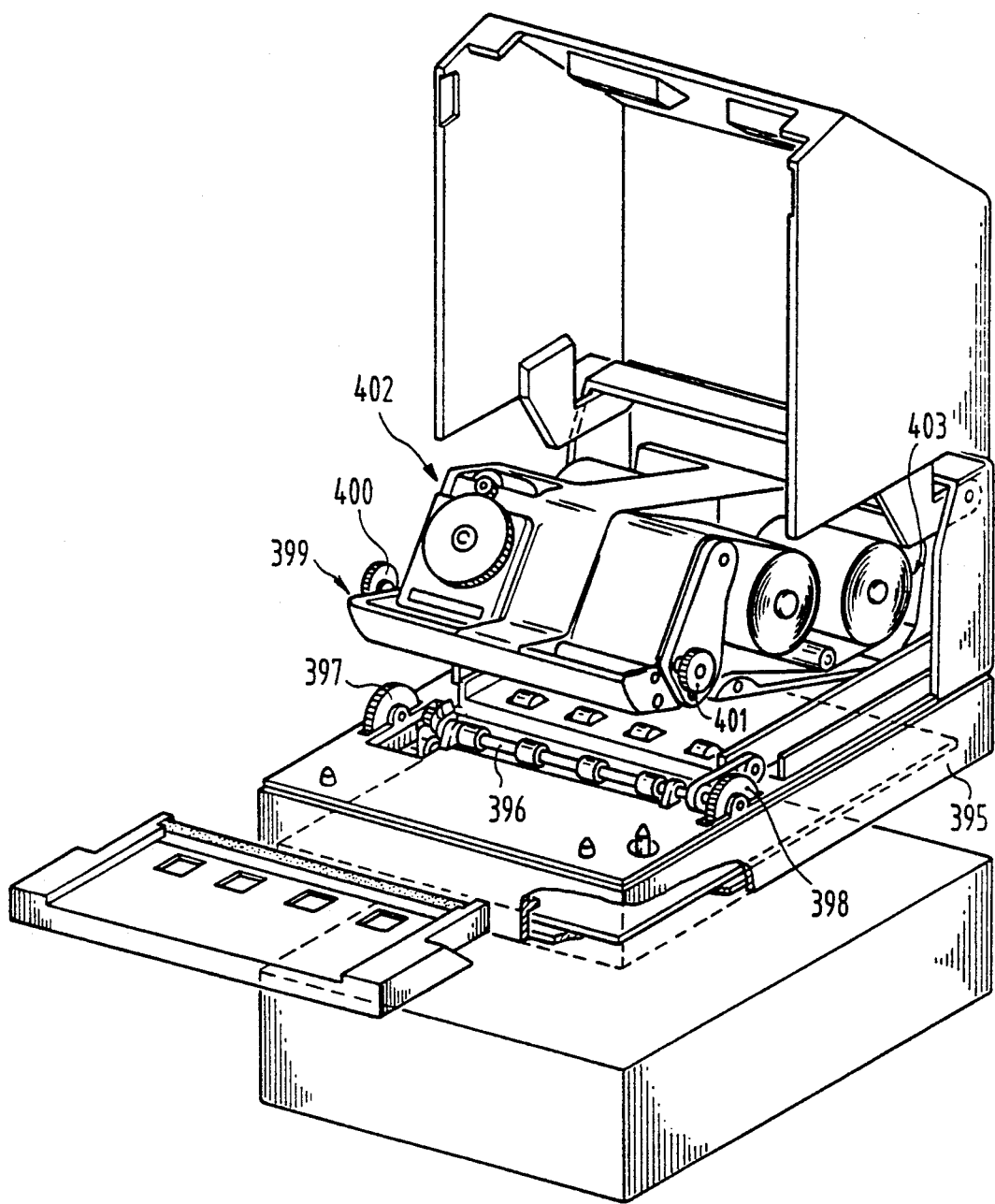
FIG. 18 is an exploded perspective view of an example of paper transport devices of the housing cover which can be coupled by coupling means to a drive arranged in the lower housing part.

FIG. 18 shows a printer approximately corresponding to FIG. 2. It corresponds to the latter to a great extent, so that it does not have to be described once again in detail. As a difference from FIG. 2, there are respectively arranged at the ends of a transport roller spindle 396, arranged in the lower housing part 395, coupling gear wheels 397, 398, which protrude above the print carrier plane. With housing cover 399 pivoted down onto the lower housing part 395, said coupling gear wheels come into engagement with assigned coupling gear wheels 400, 401. As FIG. 18 reveals, in the housing cover 399 there is provided a receipt printing station 402 as well as a day-book printing station 403, in each case with independent paper transport devices. The upper coupling gear wheel 400 is seated on a drive shaft for the paper transport device of the receipt printing station, whereas the coupling gear wheel 401 is seated on a drive shaft for the paper transport device of the day-book printing station. In this way, all the active components of the printer can be arranged in the lower housing part 395, whereas the functional components of the housing cover 399 are coupled to the drive mechanism arranged in the lower housing part 395 by the coupling means described.

Figure 19:
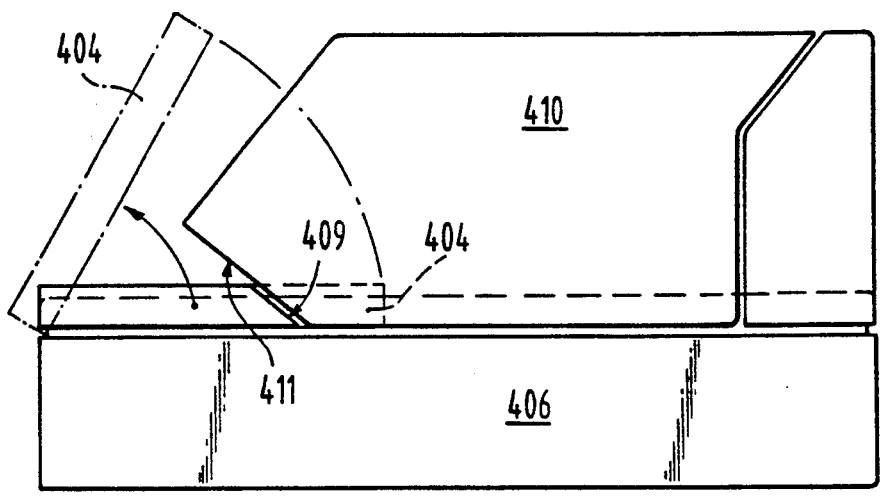
FIG. 19 is a side elevational view of a device for securing an ink ribbon cassette on the printer.
Figure 20:
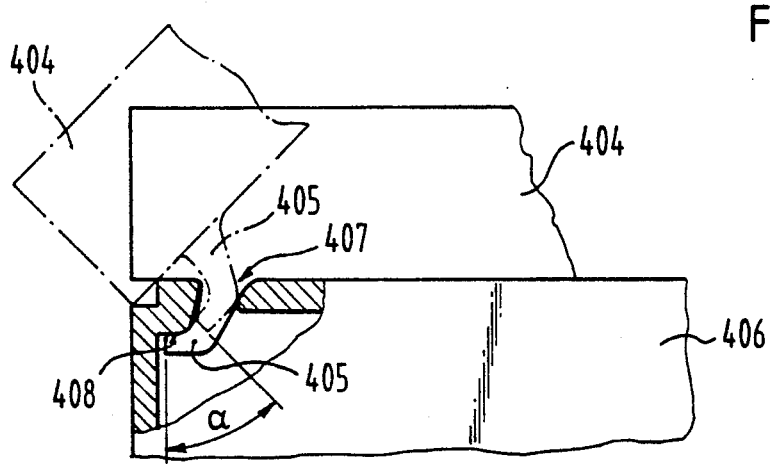
FIG. 20 is a side elevational view partly in section of the device of FIG. 19.

In order to ensure that, for example, the ink ribbon cassette 26 of FIG. 11 is held reliably in its operating position, lying on the lower housing part, a device according to FIGS. 19 and 20 is provided. As FIG. 20 shows in particular, in the rear region of an ink ribbon cassette 404 there are arranged on the underside hook-like continuations 405, which can engage in a hinge-like manner in clearances 407 formed on the upper side of the lower housing part 406. For this purpose, the ink ribbon cassette 404 is placed, in the way represented in FIG. 19, with its lower edge on the lower housing part 406, the continuations 405 engaging in the clearances 407. By tilting the ink ribbon cassette 404 downwards, the continuations 405 engage behind a bearing surface 408 and become hooked in the clearances 407. In the front region of the ink ribbon cassette 404 there are formed bearing surfaces 409 directed obliquely forwards and downwards (see also in this respect, for example, FIGS. 1, 3 and 5), against which surfaces a lower sloping surface 411, formed on the housing cover 410, comes to bear when the latter is pivoted down. As a result, the cassette is securely held in its operating position also in the front region.

Figure 21:
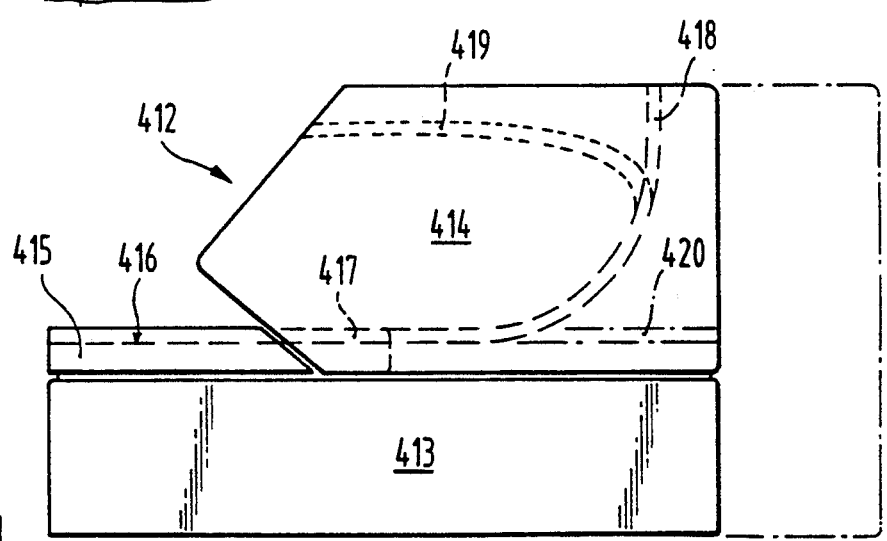
FIG. 21 is a schematic elevational view of special developments of a paper transport channel.

In the case of the illustrative embodiments described up to now, the print carrier transport channel runs preferably level along the upper side of the lower housing part. In order to ensure an adequate guidance of the print carrier also in the case of a printer shortened in the transporting direction, the configuration represented in FIG. 21 is provided. The printer 412 comprises a lower housing part 413 and a housing cover 414. The upper side of the ink ribbon cassette 415 lying on the lower housing part 413 forms a print carrier support 416. A print carrier transport channel 417, extending in continuation of the print carrier support 416, is bent off upwards in the rear part of the printer 412; it opens out either into the upper side of the housing cover 414, as the channel branch denoted by 418 shows, or out of the front side of the housing cover 414 facing the user, as the channel branch denoted by 419 shows. In each case, the print carrier transport channel is longer than a transport channel 420 taken in a straight line to the rear side of the printer would be.

Figure 22:
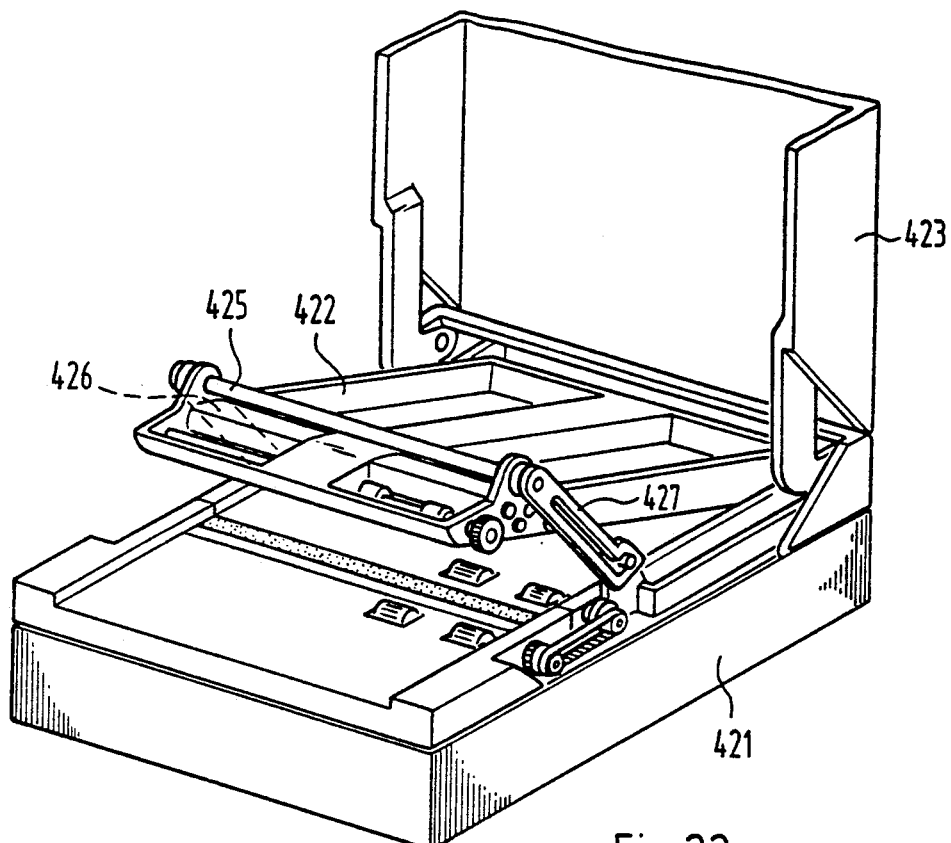
FIG. 22 is a perspective view of a device for the parallel guidance of the housing cover.
Figure 23:
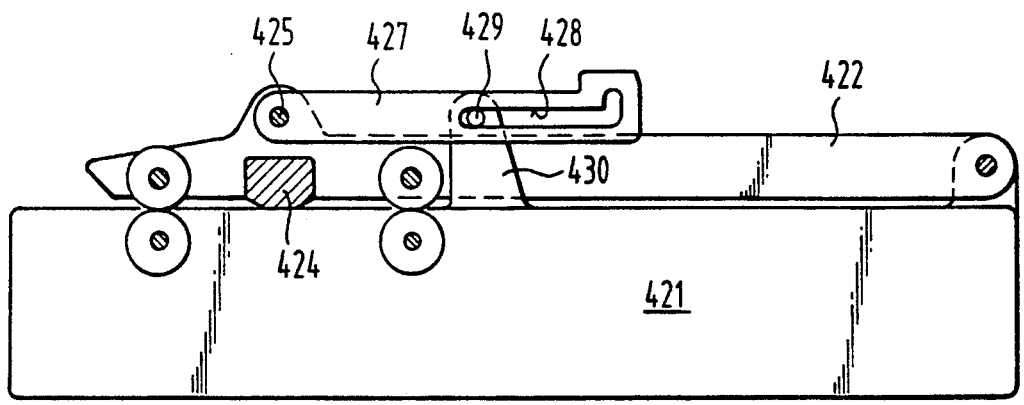
FIG. 23 is a side elevational view of the device of FIG. 22.

FIGS. 22 and 23 show a printer approximately of the type represented in FIG. 1. It comprises a lower housing part 421 and a housing cover 422 pivotably connected to the latter. In addition, a housing lid 423 is provided. In order to ensure a parallel position of the housing cover 422 with respect to the lower housing part 421, and consequently a parallel position of the printing abutment 424 with respect to the print carrier plane, in all operating states, the parallel guidance represented in FIGS. 22 and 23 is provided. At the ends of a link spindle 425, on the housing cover 422 parallel to its pivot axis, there is fastened in each case a parallel link 426, 427; the two parallel links are the same in construction and in function, so that only the parallel link 427 which can be seen in FIG. 23 is described below. The parallel link 27 has a guide groove 428 which runs in the longitudinal direction of the parallel link and into which there engages a guide pin 429, which is arranged on a block 430 connected to the lower housing part 42. In the case of a pivoting of the housing cover 422 upwards out of the pivoted-down position represented in FIG. 23, the guide slot 428 becomes displaced with respect to the guide pin 429. Since the parallel link 427 is firmly coupled to the parallel link 426 by means of the link spindle 425, the same geometrical conditions always become established on the left-hand side, in FIG. 22, of the housing cover as on the right-hand side, so that the housing cover 422 always remains parallel to the lower housing part 421 in the case of all pivoting positions.

Figure 24:
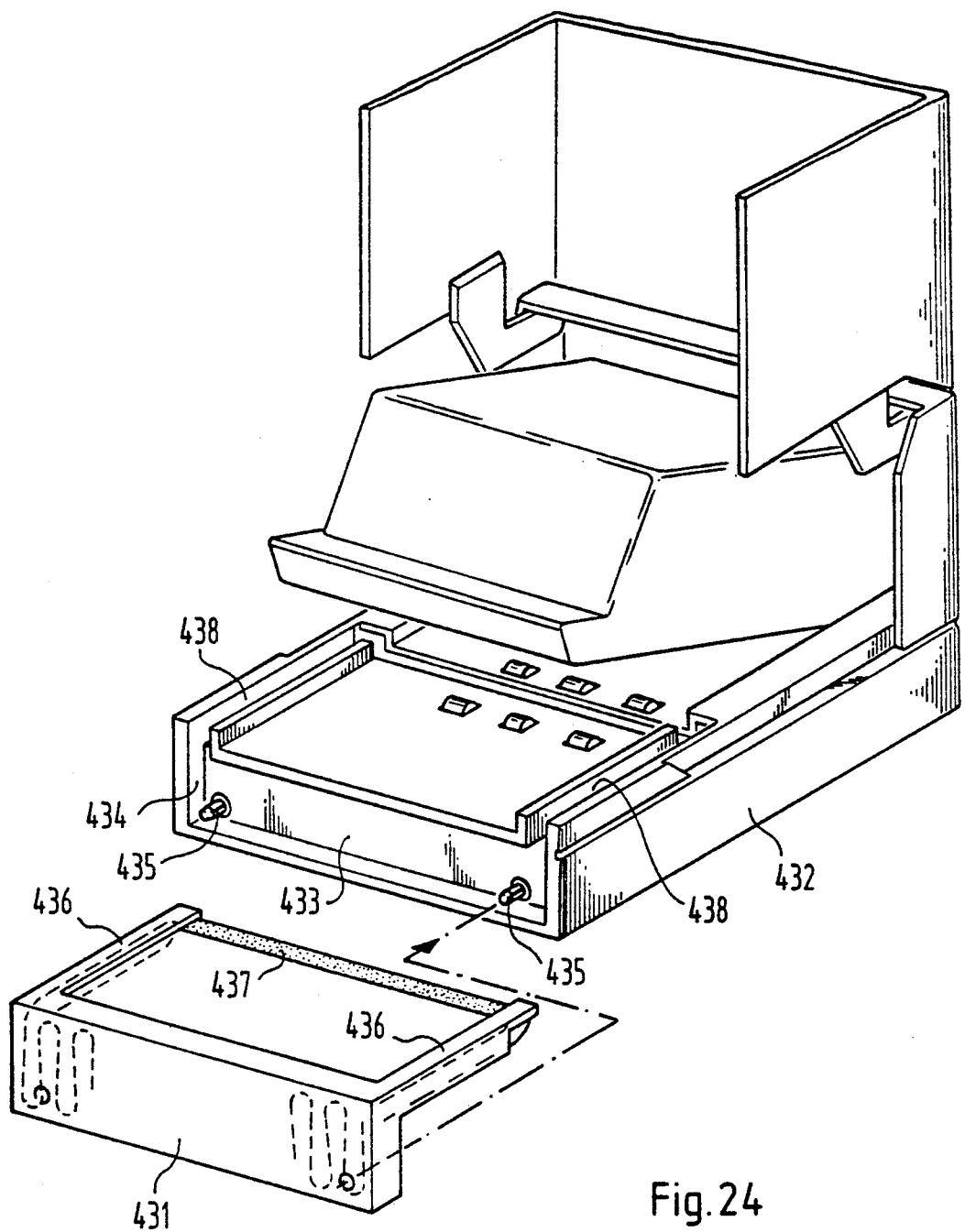
FIG. 24 is an exploded perspective view of a special arrangement of an ink ribbon cassette.

FIG. 24 shows an arrangement which essentially corresponds to the arrangements represented in FIGS. 1 and 2. In the case of these latter illustrative embodiments, the length of the lower housing part is determined in part by the dimensions of the ink ribbon cassette to be laid on it. If it is wished to shorten the lower housing part in the front region, at the same time the support surface for the ink ribbon cassette is lost. FIG. 24 shows an illustrative embodiment in which an ink ribbon cassette 431 is set vertically upright against a front end face 433 of a lower housing part 432, so that the lower housing part 432 can be shortened in the front region, irrespective of the dimensions of the cassette. For this purpose, on the front end face 433 there is provided a clearance 434, into which the ink ribbon cassette 431 can be inserted so as to fit. Through this front end face 433, serving as installation side, there extend drive pins 435, which are coupled to winding rollers for the ink ribbon, which are arranged in the ink ribbon cassette 431, when the ink ribbon cassette 431 is loaded into its operating position. The drive pins 431 are connected to drive means arranged in the lower housing part 432. Arranged on the ink ribbon cassette 431 are guide arms 436, which are aligned in the paper transporting direction and by means of which the ink ribbon 436 is guided to the printing station and is turned into a position parallel to the print carrier plane. During installation of the ink ribbon cassette 431, the guide arms 436 come to lie in receiving channels 438 assigned to said arms and formed on the lower housing part 432, so that the ink ribbon cassette 431 is securely guided during installation and securely held in its operating position.

Figure 25:
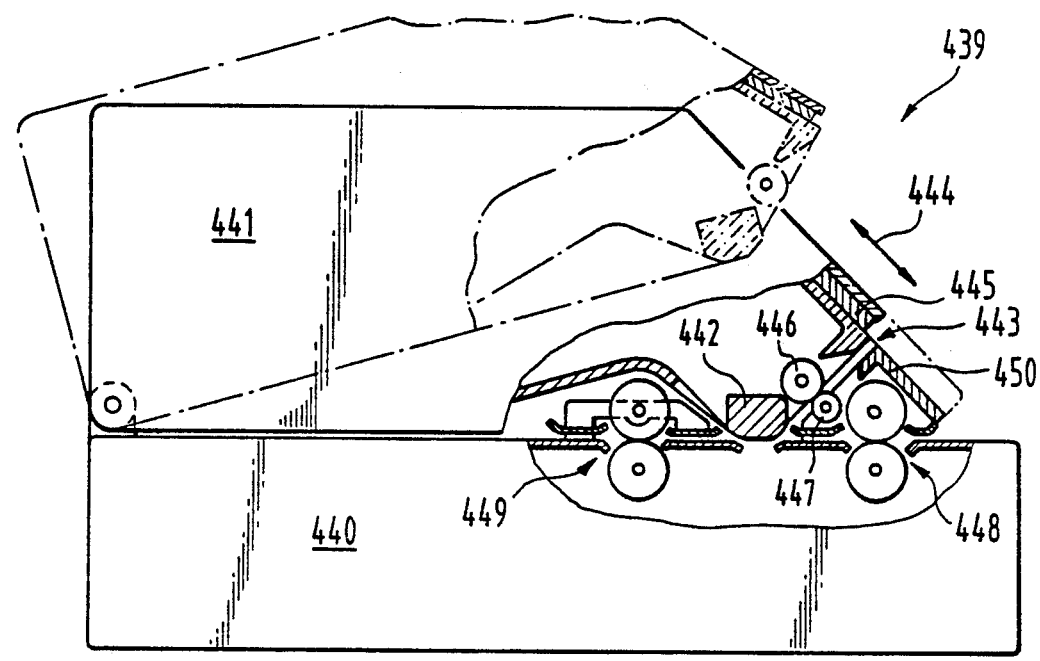
FIG. 25 is a side elevational view partly in section of a development for a cutting knife of a receipt printing station.

FIG. 25 shows a printer 439 with a lower housing part 440 and a housing cover 441 pivotably arranged on the latter. The housing cover 441 receives, inter alia, a receipt printing station, as is represented, for example, in FIG. 2. The receipt printing paper is unwound from a supply roller arranged in the housing cover 441, is guided underneath the printing abutment 442 and delivered through a delivery slot 443. A cutting knife 445, mounted movably in the housing cover 441 in the direction of the double-headed arrow 444, interacts with a counter-knife 450 in a way known per se and cuts off the receipt respectively printed in the receipt printing station. A transport roller pair 446, 447 is provided for the transport of the printing paper. The transport roller pair 448, arranged ahead of the printing abutment 442, and the transport roller pair 449, arranged behind the printing abutment, serve in the way already described for transporting a voucher guided on the upper side of the lower housing part 440. In the case of the illustrative embodiment represented in FIG. 25, it is provided that the front transport roller pair 448 and the rear transport roller pair 449 as well as the lower transport roller 447 for the receipt printing paper are assigned to the lower housing part 440; moreover, the counter-knife 450 is a component part of the lower housing part 440. The printing abutment 442, the upper transport roller 446 for the receipt printing paper as well as the cutting device with the cutting knife 445 are arranged on the housing cover. By pivoting up the housing cover 441, the transport path of the receipt printing paper becomes easily accessible, so that the loading of the printing paper is facilitated.

Figure 26:
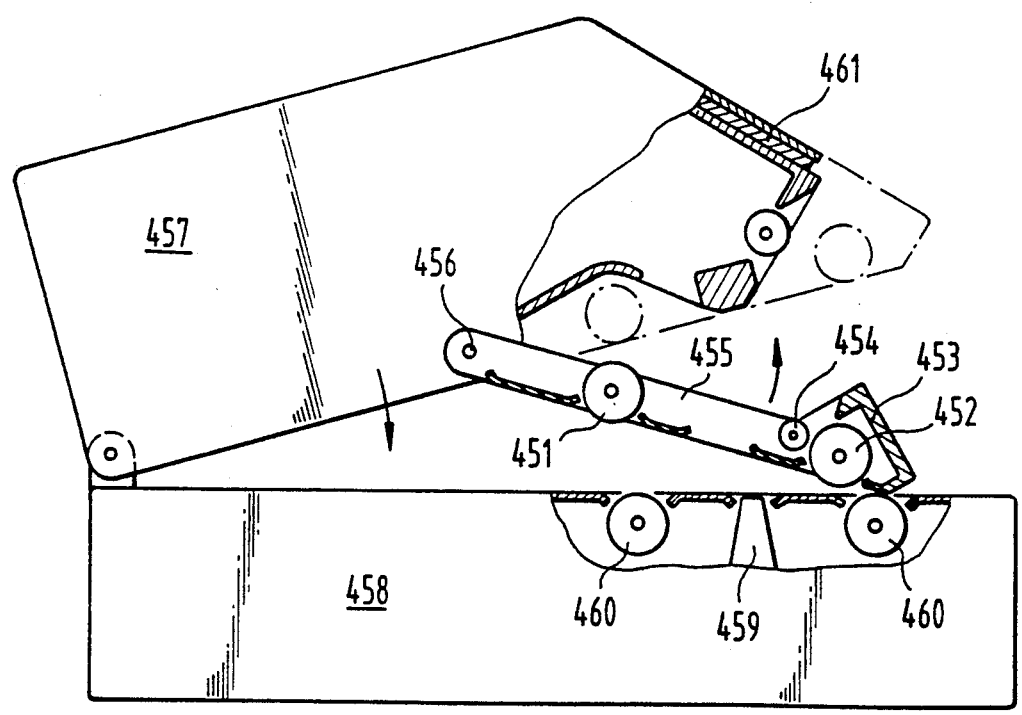
FIG. 26 is a side elevational view partly in section of another development for a cutting knife of a receipt printing station.

FIG. 26 shows an illustrative embodiment similar to the illustrative embodiment of FIG. 25. In this case, however, the upper transport rollers 451 and 452 for transporting the vouchers, the counter-knife 453 and the lower transport roller 454 for transporting the receipt printing paper are arranged on a separate rocker 455, which is arranged on the housing cover 457 pivotably about the pivot axis 456. With the position represented in FIG. 26, this arrangement makes easy access possible to the transport path of the receipt printing paper; with the rocker 455 pivoted upwards, the upper side of the lower housing part 458 is exposed, so that the transport path for the voucher, the printing head 459 and the lower transport rollers 460 are accessible, for example for servicing purposes. Moreover, with the housing cover 457 pivoted up, the rocker 455 can serve to support and fix the position of the latter. The cutting knife 401 with the cutting knife drive is arranged in the housing cover.

Figure 27:
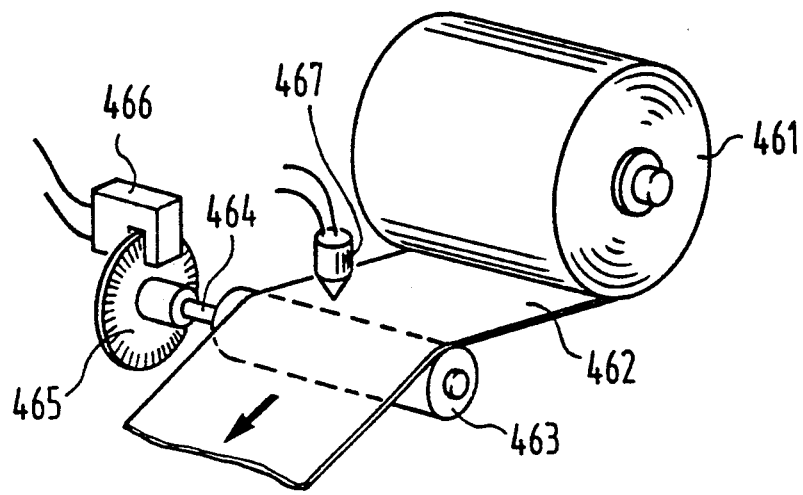
FIG. 27 is a perspective view of a sensor arrangement for a paper monitoring device.

FIG. 27 shows a detail of the monitoring of the paper transport, for example of a receipt printing station or a day-book printing station. The paper strip 462 running off the supply roller 461 runs over a deflecting roller 463 and sets the latter in rotation. Arranged on one end of a roller spindle 464, connected to the deflecting roller 463, is a timing disk 465, which interacts with a timing sensor 466. With timing disk 465 running, clock pulses are generated in the timing sensor 466, which pulses make it possible to detect a movement of the paper strip 462 and its speed of movement. Another possibility is to direct an optical movement sensor 467 at the paper strip 462. With proper paper transport, the optical movement sensor 467 passes a defined noise signal to the control.

Figure 28:
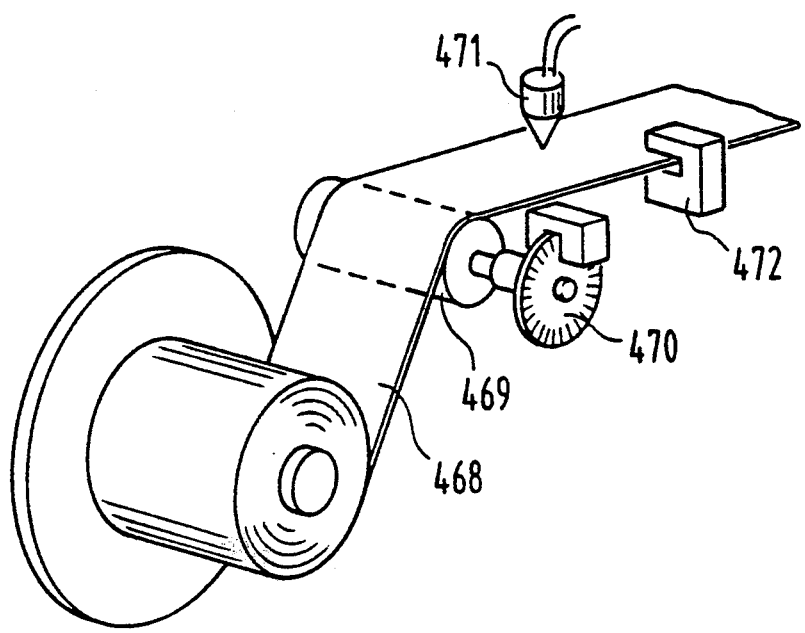
FIG. 28 is a perspective view of another sensor arrangement for a paper monitoring device.

FIG. 28 shows a similar arrangement to FIG. 27, with a timing disk 470 driven by the paper strip 468 by means of the deflecting roller 469, and with an optical movement sensor 471; both devices can be used alongside each other or alternatively. In addition there is provided a paper end indicator 472, which is designed for example as a fork light barrier and responds when no paper strip is passed through it any longer.

The paper movement indicators or the paper end indicator pass their signals to a central control, which in the event of deviation from normal operation outputs corresponding error messages or carries out error operations.

Although the present invention has been described with reference to a specific embodiment, those of skill in the art will recognize that changes may be made thereto without departing from the scope and spirit of the invention as set forth in the appended claims.

We claim:

1. A printer having at least one printing station, comprising:
    a printer housing divided into a lower housing part and an upper housing cover which can be placed on the lower housing part or lifted off the latter,
    transport roller abutments,
    the lower housing part holding a printing head which can travel in a printed line direction, lower print carrier transport rollers, interacting with the transport roller abutments for transporting a print carrier, an ink ribbon system, and drive devices for the printing head, the lower print carrier transport rollers and the ink ribbon system, and
    the upper housing cover holding a printing abutment for the printing head,
    wherein there is provided one print carrier plane, lying in a dividing plane between the lower housing part and the upper housing cover, and one printing head assigned to this print carrier plane, in that an electronic drive and control device is accommodated in the lower housing part, to which the drive devices for the printing head, the lower print carrier transport rollers, and the ribbon system are electrically connected, and
    in that an ink ribbon cassette, holding an ink ribbon, is installable in the front region of the lower housing part in such a way that its upper bounding surfaces are flush with the print carrier plane, the cassette having ribbon transport rollers arranged therein, the drive device for the ink ribbon system having at least one drive pin, the ribbon transport rollers being coupled to said at least one drive pin, protruding through an installation surface for the ink ribbon cassette.

2. The printer as claimed in claim 1, characterized in that the drive and control module arrangement (34) is designed as a flat circuit board (34) which is arranged over the bottom (32) of the lower housing part (4) and on which the assigned functional components are installed corresponding to their intended spatial arrangements.

3. The printer as claimed in claim 1 wherein an upper side of the lower housing part is formed by a top plate which lies essentially in the print carrier plane and has a depressed region for receiving the ink ribbon cassette, the depressed region shaped for the ink ribbon cassette to be laid flat into the depressed region with an upper side thereof flush with the print carrier plane, and said top plate is provided with clearances for the printing head, for said lower print carrier transport rollers lying ahead and behind the printing head in the feeding direction of the print carrier, and for said at least one drive pin for the ink ribbon cassette.

4. The printer as claimed in claim 3, characterized in that the clearance (38), for the printing head (14) is arranged in a rear region, in the feeding direction (8), of the depressed region (18a), not covered by the inserted ink ribbon cassette (26).

5. The printer as claimed in claim 3 wherein the clearances for the lower print carrier transport rollers lying ahead of the printing head in the feeding direction are arranged in a part of the depressed region covered by the inserted ink ribbon cassette and in that the ink ribbon cassette is provided with clearances for the passage of these lower print carrier transport rollers lying ahead of the printing head in the feeding direction.

6. The printer as claimed in one of claims 3 to 5, characterized in that the ink ribbon cassette (26) is provided with guide webs (26a, 26b) at the sides with respect to the feeding direction (8) of the print carrier, for the lateral guidance of the print carrier.

7. The printer as claimed in claim 1, wherein the upper housing cover is connected to the lower housing part pivotably about a pivot axis lying transversely to the feeding direction of the print carrier and parallel to the print carrier plane.

8. The printer as claimed in claim 1, comprising a plurality of printing stations wherein the housing cover is adapted for receiving the plurality of printing stations, each printing station for printing on printing paper which each comprises a paper supply roller having a supply of said paper rolled thereon as well as a paper transport device with paper transport rollers and a transport drive for the transport of the paper from the paper supply roller across the printing abutment.

9. The printer as claimed in claim 8, wherein one of the printing stations is designed as a day-book printing station and comprises a driven take-up roller which is connected to its paper transport device and arranged behind the printing abutment in the transporting direction of the paper.

10. The printer as claimed in claim 8 wherein one of the printing stations is designed as a receipt printing station and comprises a cutting-off device which is connected to a cutting drive and is arranged behind the printing abutment in the transporting direction of the paper.

11. The printer as claimed in claim 1, wherein the lower housing part has a removable bottom replaceable by an add-on housing for receiving additional electrical and/or electronic components, which can be connected to the drive and control device.

12. The printer as claimed in claim 11, wherein the add-on housing receives the electronic equipment of a PC, to which peripheral devices are connectable.

13. The printer as claimed in claim 11, wherein the printer is associated with a cash register and the add-on housing receives electronic equipment for controlling the cash register.

14. The printer as claimed in one of claims 7 to 12, characterized in that the housing cover (106) is preloaded by spring means (110) into the position lying on the lower housing part (104).

15. The printer as claimed in claim 7, wherein said lower transport rollers are arranged ahead and behind the printing head in the feed direction and wherein said transport roller abutments comprise upper transport rollers arranged to the housing cover and interacting with the lower transport rollers, wherein one of the lower and upper transport rollers lying behind the printing head in the feeding direction of the print carrier are softer than the upper and lower transport rollers lying ahead of the printing head.

16. The printer as claimed in claim 7, wherein said transport roller abutments comprise upper transport rollers, the upper housing cover has an operating position lying on the lower housing part which is irrespective of a print carrier thickness, and in that the upper transport rollers and the printing abutment are arranged on a carrier having frame means for adjusting position of the carrier essentially perpendicularly to the print carrier plane and said carrier is preloaded by spring means towards the print carrier plane.

17. The printer as claimed in claim 16, wherein the carrier is arranged on the housing cover by said frame means which comprises an articulated scissors arrangement.

18. The printer as claimed in claim 16, wherein the carrier is connected to the housing cover by said frame means which comprises a parallel link arrangement.

19. The printer as claimed in claim 16, wherein the carrier is connected to the housing cover by said frame means which comprises a longitudinal guide.

20. The printer as claimed in claim 1, wherein said transport roller abutments comprise upper transport rollers, and wherein the upper transport rollers are mounted on the upper housing cover so as to be movable essentially perpendicularly to the print carrier plane in the case of the operating position of the upper housing cover lying on the lower housing part, and are pretensioned by spring means towards the print carrier plane.

21. The printer as claimed in claim 8, wherein the lower housing part comprises lower coupling means and a drive motor connected thereto, and at least one of the drives for the paper transport devices of the printing stations arranged in the housing cover comprises upper coupling means which are connected to its respective paper transport device and, with the housing cover lying on the lower housing part, is arranged to enter into coupling engagement with the lower coupling means arranged in the lower housing part and connected to the drive motor.

22. The printer as claimed in claim 21, wherein the upper and lower coupling means are respectively formed by gear wheels which disengage when the housing cover is lifted off and engage when the housing cover is lying down.

23. The printer as claimed in one of claims 3 to 22, characterized in that on the upper front edge of the lower housing part (406) on the one hand and on the lower edge, assigned to this front edge, of the ink ribbon cassette (404) laid on the lower housing part on the other hand there are provided hinging means (405, 407, 408), which can be brought into engagement with one another and can be released from one another in the case of a position of the ink ribbon cassette (404) pivoted up with respect to the upper side of the lower housing part (406) and are connected unreleasably to one another in the case of a position of the ink ribbon cassette (404) pivoted down onto the upper side.

24. The printer as claimed in claim 3, further comprising means for holding down a front end of the ink ribbon cassette, in the feeding direction.

25. The printer as claimed in claim 24, characterized in that on the housing cover (410), there are provided holding-down surfaces (411) which, in the case of the position of the housing cover (410) lying on the lower housing part (406), come into contact with counter-surfaces (409) of an ink ribbon cassette (404) lying on the lower housing part.

26. The printer as claimed in claim 1, wherein the transport roller abutments are designed as upper transport rollers fixedly arranged in the lower housing part.

27. The printer as claimed in claim 1, wherein the transport roller abutments are designed as sliding pieces fixedly arranged in the housing cover.

28. The printer as claimed in claim 7, wherein the transport roller abutments are designed as upper transport rollers arranged on an independent rocker which is arranged between the lower housing part and the upper housing cover and is pivotable about the pivot axis of the housing cover.

29. The printer as claimed in one of claims 7 to 28, characterized in that a link spindle (425), parallel to the pivot axis, is rotatably mounted in the end region of the housing cover (422) remote from the pivot axis of the housing cover (422), and in that at each of the two ends of the link spindle (425) there is fastened a parallel link (426, 427) having a guide groove (428), running in its longitudinal direction; for the engagement of in each case a guide pin (429) arranged on the housing lower part.

30. The printer as claimed in one of claims 1 to 29, characterized in that the housing cover (414) has a print carrier guide channel, which has a first run-in section (417), aligned in extension of the print carrier plane, and a run-out section (418, 419), adjoining and bent out of the direction of the run-in section.

31. The printer as claimed in one of claims 1 to 30, characterized in that the front end face of the lower housing part (432) is designed as an installation surface (433) for an ink ribbon cassette (431), and in that guides (436) are provided for the ink ribbon section (437) running outside the ink ribbon cassette, which guide the ink ribbon between printing head and printing abutment.

32. The printer as claimed in claim 8, wherein a paper movement indicator is provided, which detects a transporting movement of the printing paper of the printing stations for signaling said printer control device.

33. The printer as claimed in claim 32, wherein said indicator comprises a timing disk mounted on a roller spindle arranged to rotate by movement of transported printing paper of a printing station and a timing sensor, the rotation of the timing disk is recorded by said timing sensor.

34. The printer as claimed in one of claims 8 to 33, characterized in that the supply roller (468) of a printing station is followed by a detector (472) detecting the end of the paper.

35. The printer as claimed in claim 10, wherein an outlet slot for the outlet of a receipt paper strip is formed in a separating joint between said upper housing cover and said lower housing part the upper housing cover arranged to be pivoted down in relation to the lower housing part, and in that the cutting-off device comprises a cutting knife, which is movable in one of the upper housing cover or the lower housing part, and a counter-knife, which is fixedly arranged on the respective other of said upper housing cover or said lower housing part.

36. The printer as claimed in claim 10, wherein said transport roller abutments comprise a rocker holding upper transport rollers, and said rocker is pivotally attached to said upper housing cover at a proximal end, and an outlet slot for the outlet of a receipt paper strip is formed in a separating joint between said upper housing cover and a distal end of said rocker, said upper housing cover pivotable downwardly onto said lower housing part, and in that the cutting-off device comprises a cutting knife arranged in the housing cover, and a counter-knife arranged on the rocker.

37. The printer as claimed in claim 33, wherein said roller spindle carriers a paper supply roller.

* * * * *